(12) United States Patent
Kobayashi et al.

(10) Patent No.: US 12,539,495 B2
(45) Date of Patent: Feb. 3, 2026

(54) METHOD FOR OPERATING HOLLOW FIBER MEMBRANE MODULE

(71) Applicant: Toray Industries, Inc., Tokyo (JP)

(72) Inventors: Kentaro Kobayashi, Otsu (JP); Satoko Kanamori, Otsu (JP); Takashi Tachibana, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/696,502

(22) PCT Filed: Sep. 29, 2022

(86) PCT No.: PCT/JP2022/036600
§ 371 (c)(1),
(2) Date: Mar. 28, 2024

(87) PCT Pub. No.: WO2023/054648
PCT Pub. Date: Apr. 6, 2023

(65) Prior Publication Data
US 2024/0390857 A1    Nov. 28, 2024

(30) Foreign Application Priority Data
Sep. 30, 2021    (JP) .................................. 2021-160479

(51) Int. Cl.
*B01D 63/02*    (2006.01)
*B01D 61/14*    (2006.01)
(Continued)

(52) U.S. Cl.
CPC ........... *B01D 63/02* (2013.01); *B01D 61/145* (2013.01); *B01D 65/02* (2013.01); *B01D 69/02* (2013.01);
(Continued)

(58) Field of Classification Search
CPC  B01D 61/145; B01D 61/146; B01D 2315/10; B01D 2321/04
See application file for complete search history.

(56) References Cited

U.S. PATENT DOCUMENTS

| | | | |
|---|---|---|---|
| 2010/0059412 A1 | 3/2010 | Leta et al. | |
| 2013/0075335 A1* | 3/2013 | Prakash | B01D 61/58 |
| | | | 210/640 |

(Continued)

FOREIGN PATENT DOCUMENTS

| | | |
|---|---|---|
| EP | 3 415 214 A2 | 12/2018 |
| EP | 4 173 698 A1 | 5/2023 |

(Continued)

OTHER PUBLICATIONS

International Search Report (Form PCT/ISA/210) and the Written Opinion of the International Searching Authority (Form PCT/ISA/237) issued Dec. 13, 2022, by the Japan Patent Office in corresponding International Application No. PCT/JP2022/036600 and its English translation. (13 pages).

(Continued)

*Primary Examiner* — Ryan B Huang
(74) *Attorney, Agent, or Firm* — Buchanan Ingersoll & Rooney PC

(57) ABSTRACT

An operation method of a hollow fiber membrane module is described, the operation method including: a filtration step of performing cross-flow filtration by supplying a feed to an outer surface side of a hollow fiber membrane, in which in the filtration step, a ratio of a viscosity $\mu_f$ of the feed to a viscosity $\mu_p$ of a filtrate satisfies a relation of $\mu_f/\mu_p \geq 1.5$, and a flow rate ratio of a flow rate $v_p$ of the filtrate to a flow rate $v_f$ of the feed satisfies a relation of $0.02 \leq v_p/v_f \leq 0.3$.

10 Claims, 4 Drawing Sheets

(51) Int. Cl.
 *B01D 65/02* (2006.01)
 *B01D 69/02* (2006.01)
 *B01D 69/08* (2006.01)

(52) U.S. Cl.
 CPC ........ *B01D 69/081* (2013.01); *B01D 2315/10* (2013.01); *B01D 2321/04* (2013.01); *B01D 2325/02832* (2022.08); *B01D 2325/02833* (2022.08)

(56) References Cited

U.S. PATENT DOCUMENTS

| | | |
|---|---|---|
| 2016/0375188 A1 | 12/2016 | Labib et al. |
| 2018/0169590 A1* | 6/2018 | Yabuno .................. B01D 69/02 |
| 2019/0015786 A1* | 1/2019 | Shimura ................. B01D 65/02 |
| 2020/0206689 A1 | 7/2020 | Kobayashi et al. |
| 2021/0039045 A1* | 2/2021 | Perreault .............. B01D 61/146 |
| 2023/0256394 A1 | 8/2023 | Kobayashi et al. |

FOREIGN PATENT DOCUMENTS

| | | |
|---|---|---|
| JP | H10-042851 A | 2/1998 |
| JP | 2009247977 A * | 10/2009 |
| JP | 2010-036183 A | 2/2010 |
| JP | 2014-124579 A | 7/2014 |
| JP | 2014-188439 A | 10/2014 |
| JP | 2020-146645 A | 9/2020 |
| WO | 2017/115769 A1 | 7/2017 |
| WO | 2017/209150 A1 | 12/2017 |
| WO | 2020/184097 A1 | 9/2020 |
| WO | 2022/004780 A1 | 1/2022 |

OTHER PUBLICATIONS

Written Opinion of the International Searching Authority (Form PCT/IPEA/408) issued Aug. 1, 2023, by the Japan Patent Office in corresponding International Application No. PCT/JP2022/036600 and an English translation of the Written Opinion. (12 pages).

International Preliminary Report on Patentability (Forms PCT/IPEA/409) issued Nov. 14, 2023, by the Japan Patent Office in corresponding International Application No. PCT/JP2022/036600 and an English translation of the International Preliminary Report on Patentability. (8 pages).

Knops et al., "The Transversal Flow Microfiltration Module. Theory, Design, Realization and Experiments", Journal of Membrane Science, (Jan. 1, 1992), vol. 73. pp. 153-161.

Suarez et al., "Dead-End Microfiltration as Advanced Treatment for Wastewater", Desalination, (Jan. 1, 2000), vol. 127, No. 1, pp. 47-58.

Extended European Search Report issued Feb. 11, 2025, by the European Patent Office in corresponding European Patent Application No. 22876511.1-1014. (13 pages).

Office Action (Communication pursuant to Article 94(3) EPC) issued Oct. 17, 2025, by the European Patent Office in corresponding European Patent Application No. 22 876 511.1-1014. (12 pages) .

* cited by examiner ("45" and "46" are changed to white background)

METHOD FOR OPERATING HOLLOW FIBER MEMBRANE MODULE

CROSS REFERENCE TO RELATED APPLICATIONS

This application is the U.S. National Phase of PCT/JP2022/036600, filed Sep. 29, 2022, which claims priority to Japanese Patent Application No. 2021-160479, filed Sep. 30, 2021, the disclosures of these applications being incorporated herein by reference in their entireties for all purposes.

FIELD OF THE INVENTION

The present invention relates to an operation method of a hollow fiber membrane module for filtration.

BACKGROUND OF THE INVENTION

In recent years, membrane filtration using a separation membrane has been widely applied to various fields such as a fermentation field involving culture of microorganisms and cultured cells, a pharmaceutical field, and a food and drink field, in addition to a water treatment field such as drinking water production, water purification treatment, and wastewater treatment. Among separation membranes, membrane filtration using a hollow fiber membrane module is used in many fields in view of the amount of water treated, ease of cleaning, and the like.

In the water treatment field, there are many cases of filtering a relatively clear feed, whereas in the fermentation field, pharmaceutical field, and food and drink field, there are many cases of handling a feed having high turbidity and high viscosity. In the case where the turbidity or the viscosity is high, if dead-end filtration operation, which is often adopted in the water treatment field, is applied, blockage of the hollow fiber membrane, that is, so-called fouling proceeds rapidly. Therefore, in these fields, a cross-flow filtration operation capable of reducing fouling is performed. The cross-flow filtration operation is a method of causing a feed to normally flow parallel to a surface of a hollow fiber membrane, and filtering a part of the feed.

In this method, since the operation can be performed while preventing accumulation of suspended substances on the surface of the hollow fiber membrane by the action of the flow parallel to the surface of the hollow fiber membrane, fouling can be greatly reduced. Along with the expansion of applications of separation membranes, there is an increasing need for a technique of more stable operation by cross-flow filtration with respect to a feed having high turbidity or high viscosity.

In the case of cross-flow filtration of a feed having high turbidity or high viscosity, either an external pressure type in which the feed is introduced to an outer surface side of the hollow fiber membrane or an internal pressure type in which the feed is introduced to an inner surface side of the hollow fiber membrane is used. For example, Patent Literatures 1 and 2 disclose methods of filtering a solution having high viscosity by internal pressure type cross-flow filtration using an ultrafiltration membrane.

However, in the case where a feed having high turbidity or high viscosity is subjected to the internal pressure type cross-flow filtration, since a flow channel size of the feed is smaller than that in the external pressure type, blockage of the flow channel or pressure loss due to the flow of the feed may be increased, and as a countermeasure, it is necessary to increase an inner diameter of the hollow fiber membrane. As a result, a membrane area of the hollow fiber membrane module decreases, and a filtrate amount of the hollow fiber membrane module decreases. Therefore, the external pressure type cross-flow filtration is often suitable for such a feed.

Patent Literature 3 discloses a method of applying the external pressure type cross-flow filtration to an oil-water separation application, and Patent Literature 4 discloses a method of subjecting a yeast culture solution to the external pressure type cross-flow filtration. Patent Literature 3 describes that it is preferable to set a large average value of dimensions among hollow fiber membranes in order to prevent blockage of a flow channel in the external pressure type cross-flow filtration.

PATENT LITERATURE

Patent Literature 1: JP2020-146645A
Patent Literature 2: JPH10-42851A
Patent Literature 3: JP2010-36183A
Patent Literature 4: WO2017/209150A1

SUMMARY OF THE INVENTION

In the case of subjecting a solution having high viscosity to the external pressure type cross-flow filtration, a difference occurs between the viscosity on the feed side and the viscosity on the filtrate side due to viscosity-increasing components being blocked by the separation membrane, and a difference between a transmembrane pressure on a feed inlet side and a transmembrane pressure on a feed outlet side of the hollow fiber membrane module (hereinafter referred to as transmembrane pressure difference) becomes large. As a result, there is a problem that blockage of the hollow fiber membrane on the feed inlet side having a large transmembrane pressure becomes fast, and a time until reaching an upper limit of the transmembrane pressure of the entire hollow fiber membrane module becomes short, thereby increasing cleaning frequency. For this reason, there has been a demand for an operation technique for reducing the transmembrane pressure difference to reduce the blockage speed in the case where the difference in viscosity occurs between the feed side and the filtrate side.

Patent Literature 1 discloses a method capable of maintaining a filtration flow amount at a high level by returning back-wash wastewater to the feed in order to reduce blockage of the hollow fiber membrane due to an increase in viscosity of the feed. Patent Literature 2 discloses a method of controlling the Reynolds number during circulation and filtration in order to reduce clogging of hollow fibers and obtain a large permeation flux. Patent Literature 3 describes that, in the case of an external pressure circulation type, dirt on a membrane surface of a hollow fiber membrane can be removed by a flow of a liquid to be treated, and filtration can be continued while reducing dirt and clogging on the membrane surface even when a water-insoluble oil content or a concentration of suspended substances in the liquid to be treated is high. Patent Literature 4 describes that, when a yeast culture solution is subjected to the external pressure type cross-flow filtration, operation can be performed without breaking the hollow fiber membrane by using a high-strength hollow fiber membrane.

However, none of these patent literatures discloses a method for reducing the transmembrane pressure difference caused by the difference in viscosity between the feed and the filtrate. Accordingly, an object of the present invention is to provide an operation method of a hollow fiber membrane module, which is capable of reducing a transmembrane pressure difference, reducing a blockage speed, and reducing a cleaning frequency, in a case where a difference in viscosity occurs between a feed and a filtrate in external pressure type cross-flow filtration.

In order to achieve the above object, the present invention provides the following operation method of a hollow fiber membrane module.

<1> An operation method of a hollow fiber membrane module, the operation method including:
a filtration step of performing cross-flow filtration by supplying a feed to an outer surface side of a hollow fiber membrane, in which
in the filtration step, a ratio of a viscosity $\mu_f$ of the feed to a viscosity $\mu_p$ of a filtrate satisfies a relation of $\mu_f/\mu_p \geq 1.5$, and a flow rate ratio of a flow rate $v_p$ of the filtrate to a flow rate $v_f$ of the feed satisfies a relation of $0.02 \leq v_p/v_f \leq 0.3$.

<2> The operation method of a hollow fiber membrane module according to <1>, in which
in the filtration step, the viscosity $\mu_f$ of the feed is 3.0 mPa·s or more.

<3> The operation method of a hollow fiber membrane module according to <1> or <2>, in which
in the filtration step, a concentration of dissolved organic carbon in the feed is 1,000 mg/L or more and 100,000 mg/L or less.

<4> The operation method of a hollow fiber membrane module according to any one of <1> to <3>, in which
the hollow fiber membrane is an ultrafiltration membrane.

<5> The operation method of a hollow fiber membrane module according to any one of <1> to <4>, in which
a breaking load of the hollow fiber membrane is 500 gf/fiber or more.

<6> The operation method of a hollow fiber membrane module according to any one of <1> to <5>, in which
in the filtration step, the viscosity $\mu_f$ of the feed and the flow rate $v_f$ of the feed satisfy a relation of $v_f \leq -0.135\mu_f + 3.0$.

<7> The operation method of a hollow fiber membrane module according to any one of <1> to <6>, in which
an inner diameter $D_i$ of the hollow fiber membrane satisfies a relation of 300 μm $\leq D_i \leq$ 1000 μm.

<8> The operation method of a hollow fiber membrane module according to any one of <1> to <7>, in which
a filling rate of the hollow fiber membrane module is 25% or more and 45% or less.

<9> The operation method of a hollow fiber membrane module according to any one of <1> to <8>, in which
a membrane length of the hollow fiber membrane is 0.50 m or more and 2.00 m or less.

<10> The operation method of a hollow fiber membrane module according to any one of <1> to <9>, the operation method further including:
a backwashing step of flowing a cleaning liquid from an inner surface to an outer surface of the hollow fiber membrane, in which
a pore diameter $\varphi_o$ of the outer surface of the hollow fiber membrane satisfies a relation of 0.005 μm $\leq \varphi_o \leq$ 0.02 μm, and
a ratio of a pore diameter $\varphi_i$ of the inner surface of the hollow fiber membrane to the pore diameter $\varphi_o$ of the outer surface satisfies a relation of $\varphi_i/\varphi_o > 50$.

The present invention is capable of reducing a transmembrane pressure difference to reduce a blockage speed, and reducing a cleaning frequency, in a case where a difference in viscosity occurs between a feed and a filtrate in external pressure type cross-flow filtration.

DETAILED DESCRIPTION OF EMBODIMENTS OF THE INVENTION

Hereinafter, embodiments of the present invention will be described in detail with reference to the drawings, but the present invention is not limited in any way by these embodiments.

Figure 1:
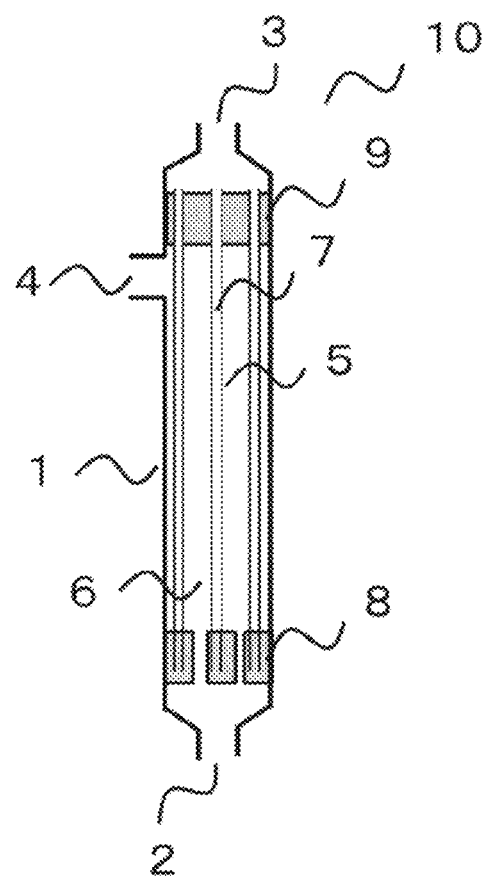
FIG. 1 is a schematic view showing an embodiment of a hollow fiber membrane module of the present invention.

FIG. 1 is a schematic view showing an embodiment of a hollow fiber membrane module of the present invention. Hereinafter, in the present description, directions such as "upper", "lower", and the like are based on a state shown in the drawings and are for convenience, and in FIG. 1, a filtrate outlet port 3 side is referred to as an upper direction and a feed inlet port 2 side is referred to as a lower direction.

In a hollow fiber membrane module 10 of the present invention, a container 1 including a feed inlet port 2, a filtrate outlet port 3, and a feed outlet port 4 is loaded with hollow fiber membranes 5. Both ends of the hollow fiber membrane 5 are embedded in a first potting portion 8 and a second potting portion 9, respectively, and the first potting portion 8 and the second potting portion 9 are fixed to the container 1. A lower end of the hollow fiber membrane 5 embedded in the first potting portion 8 is sealed. The first potting portion 8 includes a plurality of through holes through which a feed introduced from the feed inlet port 2 passes. On the other hand, an upper end of the hollow fiber membrane 5 embedded in the second potting portion 9 is embedded in an open state.

The feed inlet port 2, the filtrate outlet port 3, and the feed outlet port 4 are cylindrical nozzles that connect the container 1 and a pipe (not shown), and are similarly fixed to the cylindrical container 1 in an open state. The feed inlet port 2 is connected to a lower end of the container 1, and the filtrate outlet port 3 is connected to an upper end thereof. The feed outlet port 4 is connected to a side surface of the container 1 and is provided near the second potting portion 9. Any of resin and metal can be used as material thereof.

The hollow fiber membrane 5 in the container 1 is a membrane of hollow fiber shape having a liquid separation function. The hollow fiber membrane 5 is contained such that an axial direction of the container 1 is parallel to an axial direction of the hollow fiber membrane 5. The axial directions refer to a longitudinal direction of the container 1 and a longitudinal direction of the hollow fiber membrane 5.

The first potting portion 8 and the second potting portion 9 to which the plurality of hollow fiber membranes are fixed by an adhesive are portions in which gaps between the bundled hollow fibers are filled with a potting agent containing a potting resin as a main component, which is the so-called adhesive. The potting portion is preferably formed in ends of the hollow fiber membrane bundle.

The potting resin as a main component of the potting agent is preferably an epoxy resin, a polyurethane resin, or a silicone resin, which is excellent in adhesion to the hollow fiber membrane, heat resistance, and chemical durability. In addition to the potting resin, the potting agent may contain an additive such as silica, talc, mica, clay, calcium carbonate, glass, or rubber.

The first potting portion 8 is formed in a feed inlet port side end of the hollow fiber membrane 5. It is preferable that the feed inlet port side end of the hollow fiber membrane 5 is sealed. By sealing the feed inlet port side end, the filtrate flowing through a hollow portion flows in one direction, and a pressure difference can be generated between the feed inlet port side end and a filtrate outlet port side end on the filtrate side of the hollow fiber membrane 5. Here, "sealed" means a state in which the liquid flowing in the hollow fiber membranes 5 is not discharged from the sealed end.

The first potting portion 8 is fixed to the container 1, and has a plurality of through holes through which the feed introduced from the feed inlet port 2 can pass, and the feed is introduced into the hollow fiber membranes 5 through the through holes. The shape and number of the through holes are not specified, and are appropriately provided to reduce resistance and occurrence of flow unevenness according to a flow amount of the feed passing through.

The first potting portion 8 may be adhesively fixed to the container 1 or may have a removable cartridge structure as long as the first potting portion 8 is fixed in position so as not to float up due to the flow of the feed. The position fixing method is not particularly limited, and a structure of fixing the position between the container 1 and the first potting portion 8 or a structure of fixing the position between the second potting portion 9 and the first potting portion 8 can be appropriately selected.

The first potting portion 8 is not essential as long as the feed inlet port side end of the hollow fiber membrane 5 is sealed, and may not be a so-called fixed end in which the hollow fiber membrane bundles are fixed to each other with a potting agent, but may be a free end which is not fixed with a potting agent. The free end is a state in which the hollow fiber membranes are not fixed to each other with a potting agent and are freely movable. In this case, as a method for sealing the feed inlet port side end of the hollow fiber membrane 5, a method of injecting a potting agent into the hollow portion of the hollow fiber membrane 5 to seal, a method of welding the end by heat to seal, or the like can be applied.

Next, the second potting portion 9 is formed on the filtrate outlet port side end of the hollow fiber membrane 5, and is fixed in a state where the filtrate outlet port side end of the hollow fiber membrane 5 is open. The open state is a state in which the liquid flowing inside the hollow fiber membrane is discharged from the open end.

Although the second potting portion 9 is fixed to the container 1, the second potting portion 9 and the container 1 may be adhesively fixed to each other, or the second potting portion 9 may have a so-called cartridge type structure in which the hollow fiber membrane can be attached and detached, as long as the feed and the filtrate can be separated in a liquid-tight manner. In the case of the cartridge type, the second potting portion 9 and the container 1 may be connected via an O-ring or the like.

In the hollow fiber membrane module having the above structure, an interior of the container 1 is separated by the hollow fiber membrane 5 and the second potting portion 9 into a feed side space 6 filled with the feed and a filtrate side space 7 filled with the filtrate, and the feed side space 6 is a space in contact with an outer surface of the hollow fiber membrane 5, and the filtrate side space 7 is a space in contact with an inner surface of the hollow fiber membrane 5.

The present invention is applied to a so-called external pressure type hollow fiber membrane module in which the feed inlet port 2 and the feed outlet port 4 are connected to the feed side space 6 and the filtrate outlet port 3 is connected to the filtrate side space 7.

Next, an operation method using the hollow fiber membrane module shown in FIG. 1 will be described with reference to FIG. 2.

Figure 2:
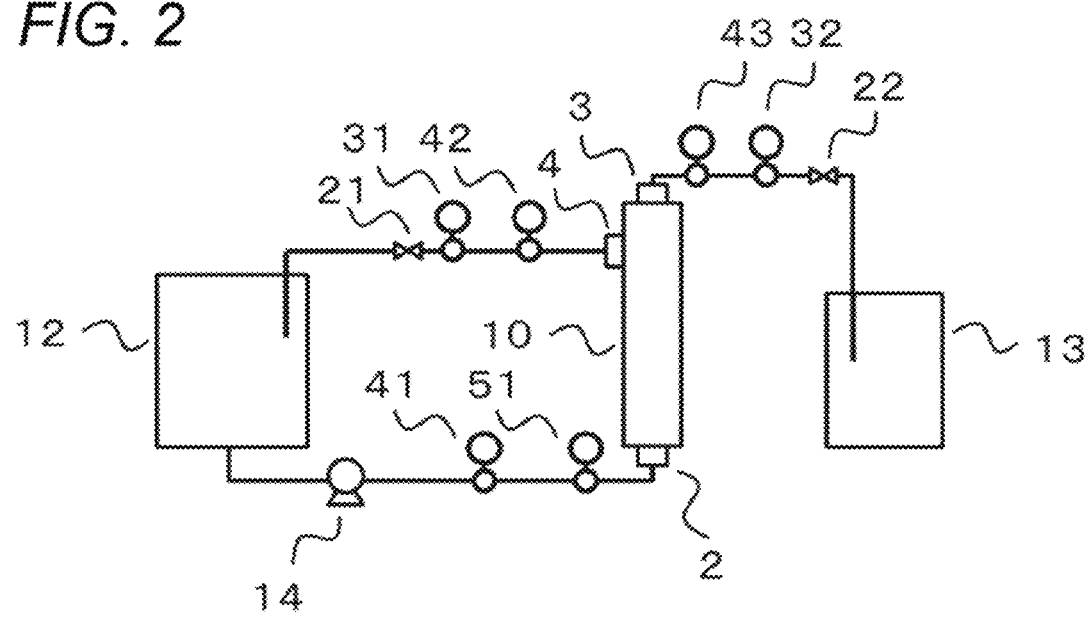
FIG. 2 is a schematic flow diagram showing an embodiment of a membrane filtration unit to which cross-flow filtration is applied.

FIG. 2 is a flow diagram of a membrane filtration unit. The feed is supplied from a feed tank 12 to the container 1 by a supply pump 14. The feed introduced from the feed inlet port 2 into the container 1 passes through the through holes of the first potting portion 8 shown in FIG. 1, and is sent through the feed side space 6 in a flow parallel to the axial direction of the hollow fiber membrane 5. Thereafter, it is discharged from the container 1 through the feed outlet port 4.

The cross-flow filtration operation is an operation method in which, by circulating at a flow amount of approximately 10 to 30 times the filtration flow amount, accumulation of membrane blockage components derived from the feed on the membrane surface can be prevented by a shearing effect of the flow, and stable filtration is enabled. It is an operation method particularly suitable for filtering a feed containing a large amount of blockage components to be accumulated on the membrane surface.

The operation is often performed such that a filtrate flow amount observed by a filtrate flowmeter 32 is constant. In the cross-flow filtration operation, a difference between an average value of a feed inlet pressure P1 and a feed outlet pressure P2 observed by a feed inlet pressure gauge 41 and a feed outlet pressure gauge 42 and a filtrate outlet pressure P3 observed by the filtrate outlet pressure gauge 43 is referred to as an average transmembrane pressure, and the operation is continued until the average transmembrane pressure reaches a predetermined pressure.

In the external pressure type cross-flow filtration operation, a high pressure loss occurs in the feed side space 6 due to the feed flow in the feed side space 6. Therefore, a high feed side pressure is applied to the feed inlet side end of the hollow fiber membrane 5, so that a load on that position will be high. On the other hand, a pressure loss occurs in the filtrate side space 7 inside the hollow fiber membrane, similarly to the filtrate. Although the filtrate flow is slower than the feed flow, since a flow channel of the filtrate side space 7 is smaller than a flow channel of the feed side space 6, a higher pressure loss also occurs in the filtrate side space 7. As a result, on the feed inlet port side end of the hollow fiber membrane 5, the feed side pressure and a filtrate side pressure are both high, so that an increase in the transmembrane pressure can be prevented.

However, in the case where the feed and the filtrate are different in viscosity, particularly in the case where viscosity-increasing components in the feed is held in the feed side space by the separation membrane and viscosity of the filtrate is smaller than that of the feed, the pressure loss in the filtrate side space 7 is smaller than the pressure loss in the feed side space 6. As a result, on the feed inlet port side end of the hollow fiber membrane 5, the feed side pressure is high, and the filtrate side pressure is small, and the transmembrane pressure on this position tends to be increased. Therefore, at the feed inlet port side end of the hollow fiber membrane 5, an excessive amount of liquid is filtered as compared with the filtrate outlet port side end, which is a factor for promoting fouling.

In order to solve this problem, as a result of intensive studies, the present inventors found that, in a hollow fiber membrane module that performs external pressure type cross-flow filtration, the transmembrane pressure difference in the axial direction of the hollow fiber membrane can be reduced by controlling the flow rate on the feed side and the flow rate on the filtrate side to be within predetermined ranges, and completed the present invention of the operation method of a hollow fiber membrane module.

That is, in the operation method of a hollow fiber membrane module according to the present invention, operation is performed such that when cross-flow filtration is performed by supplying the feed to the outer surface side of the hollow fiber membrane as a filtration step, when a ratio of a viscosity $\mu_f$ of the feed to a viscosity $\mu_p$ of the filtrate satisfies $\mu_f/\mu_p \geq 1.5$, a flow rate ratio of a flow rate $v_f$ of the feed to the flow rate $v_p$ of the filtrate satisfies $0.02 \leq v_p/v_f \leq 0.3$.

When the ratio between the viscosity $\mu_f$ of the feed and the viscosity $\mu_p$ of the filtrate (the ratio of the viscosity $\mu_f$ of the feed to the viscosity $\mu_p$ of the filtrate) $\mu_f/\mu_p$ is 1.5 or more, the pressure loss in the filtrate side space 7 becomes smaller than the pressure loss in the feed side space 6, but by controlling the flow rate ratio between the flow rate $v_f$ of the feed and the flow rate $v_p$ of the filtrate (the ratio of the flow rate $v_p$ of the filtrate to the flow rate $v_f$ of the feed) to $0.02 \leq v_p/v_f \leq 0.3$, the pressure loss on the feed side and the filtrate side can be made uniform while ensuring the necessary filtrate flow amount and reducing a filtration cost, and progress of fouling can be inhibited.

More specifically, by satisfying $v_p/v_f \geq 0.02$, even when $\mu_f/\mu_p$ is 1.5 or more, the difference between the pressure loss on the feed side and the pressure loss on the filtrate side can be reduced, and an increase in the transmembrane pressure difference can be prevented. As a result, fouling can be inhibited. Furthermore, by satisfying $v_p/v_f \geq 0.02$, the filtrate flow amount does not become excessively small, and a necessary filtrate flow amount can be ensured, and therefore, the number of membranes can be reduced and the filtration cost can be decreased. On the other hand, by satisfying $v_p/v_f \leq 0.3$, it is possible to prevent a circulation flow amount of the feed from becoming excessively smaller than the filtrate flow amount, and therefore it is possible to ensure a feed flow necessary for preventing the accumulation of the membrane blockage components derived from the feed on the membrane surface. As a result, progress of fouling can be prevented. It is preferable that $0.02 \leq v_p/v_f \leq 0.2$, and more preferable that $0.03 \leq v_p/v_f \leq 0.15$.

A method for measuring the flow rate $v_f$ of the feed and the flow rate $v_p$ of the filtrate will be described with reference to FIGS. 1 and 2. The flow rate $v_f$ of the feed is calculated by dividing a concentrate flow amount $Q_c$ measured by a concentrate flowmeter 31 by a flow channel area $S_f$ of the feed side space 6 of the hollow fiber membrane module 10. The flow channel area $S_f$ of the feed side space is a value obtained by subtracting a total cross-sectional area of the hollow fiber membranes 5 inserted into the container 1 from a cross-sectional area of the container 1. Assuming that an inner diameter of the container 1 is $D_c$, an outer diameter of the hollow fiber membrane 5 is $D_o$, and the number of hollow fiber membranes 5 is N, it is calculated by the following Formula (1).

[Formula 1]
$$v_f = \frac{Q_c}{S_f} = \frac{Q_c}{\pi(D_c/2)^2 - \pi(D_0/2)^2 N} \quad (1)$$

The flow rate $v_p$ of the filtrate is calculated by dividing a filtrate flow amount $Q_p$ measured by the filtrate flowmeter 32 by a flow channel area $S_p$ of the filtrate side space 7. The flow channel area $S_p$ of the filtrate side space 7 is calculated by the following Formula (2), assuming that an inner diameter of the hollow fiber membrane 5 is $D_i$.

[Formula 2]
$$v_p = \frac{Q_p}{S_p} = \frac{Q_p}{\pi(D_i/2)^2 N} \quad (2)$$

Regarding the flow rate $v_f$ of the feed, instead of the concentrate flow amount $Q_c$, a supplied liquid flowmeter may be provided between the feed inlet port 2 and the supply pump 14, and a measured supplied liquid flow amount $Q_f$ may be used. Also in this case, the flow rate $v_f$ of the feed is calculated in the same manner.

Since the values of the viscosity $\mu_f$ of the feed and the viscosity $\mu_p$ of the filtrate greatly change with temperature, it is preferable to measure the viscosity at the feed temperature measured by the feed thermometer 51. Furthermore, since the viscosity may change due to shearing caused by the flow of the feed or the filtrate, it is preferable to measure the viscosity when a shear speed $\gamma$ is applied due to the flow during operation.

The shear speed $\gamma$ is simply calculated from a flow rate v and a flow channel diameter $D_e$ by the following Formula (3). The flow channel diameter $D_e$ of the filtrate side space 7 is the inner diameter $D_i$ of the hollow fiber membrane 5. On the other hand, since the feed side space 6 has a complicated shape, an equivalent diameter calculated by the following Formula (4) is defined as the flow channel diameter $D_e$.

[Formula 3]
$$\gamma = \frac{4v}{D_e} \quad (3)$$

[Formula 4]
$$D_e = \frac{4S_f}{\pi D_0 N + \pi D_c} \quad (4)$$

As for a method for measuring the viscosity, a viscosity measured at the same temperature and shear speed as in actual operation using a capillary viscometer is defined as the viscosity in the present invention. That is, the method is measuring a viscosity $\mu$ using the following Formula (5) from a tube inlet pressure $P_1$ and a tube outlet pressure $P_2$ when a fluid is passed through a fine tube having a tube inner diameter $D_v$ and a tube length $L_v$ at a flow rate $v_v$. Using the above Formula (3), the flow rate $v_v$ in the fine tube is set so that the shear speed during the actual operation and the shear speed in the capillary viscometer are the same, and then the viscosity is measured.

[Formula 5]

$$\mu = \frac{D_v^2(P_1 - P_2)}{32 v_v L_v} \quad (5)$$

The capillary viscometer is not particularly limited as long as the temperature of the tube can be adjusted and the pressure at the inlet and outlet of the tube can be measured, and any commercially available or self-produced apparatus can be used.

Although the viscosity may change as the operation is continued, at least the ratio of the viscosity $\mu_f$ of the feed to the viscosity $\mu_p$ of the filtrate in an initial stage of the operation is preferably $\mu_f/\mu_p \geq 1.5$. The initial stage of the operation is a timing at which filtration is started for the first time by introducing the feed into a new hollow fiber membrane module, or a timing at which filtration is started by newly introducing the feed after chemical cleaning the hollow fiber membrane module blocked after filtration to recover water transmissivity. From the viewpoint of inhibiting the progress of clogging, it is preferable that the operation is performed such that the flow rate ratio of the flow rate $v_f$ of the feed to the flow rate $v_p$ of the filtrate satisfies $0.02 \leq v_p/v_f \leq 0.3$ when there is a difference in viscosity at the beginning of operation.

The flow rate $v_f$ of the feed preferably satisfies $0.30$ m/s $\leq v_f \leq 1.80$ m/s. By satisfying $v_f \geq 0.30$ m/s, accumulation of suspended substances on the surface of the hollow fiber membrane due to the action of the feed flow can be reduced, and the progress of fouling can be inhibited. By satisfying $v_f \leq 1.80$ m/s, the pressure loss in the feed side space 6 can be reduced, and the feed side pressure applied to the feed inlet port side end of the hollow fiber membrane 5 can be reduced. As a result, the load on the position can be reduced, and as a result, the progress of fouling can be inhibited. The flow rate $v_f$ of the feed preferably satisfies $0.50$ m/s $\leq v_f \leq 1.50$ m/s, and more preferably satisfies $0.70$ m/s $\leq v_f \leq 1.30$ m/s.

The flow rate $v_p$ of the filtrate preferably satisfies $0.006$ m/s $\leq v_p \leq 0.30$ m/s. By satisfying $v_p \geq 0.006$ m/s, the pressure loss in the filtrate side space 7 can be increased, and the pressure loss difference with the feed side space 6 can be reduced. Furthermore, since filtration flux itself can be increased, the number of necessary membrane modules can be reduced. By satisfying $v_p \leq 0.30$ m/s, the pressure loss in the filtrate side space 7 can be prevented from becoming excessively high, and the pressure loss difference from the feed side space 6 can be reduced. The flow rate $v_p$ of the filtrate preferably satisfies $0.01$ m/s $\leq v_p \leq 0.25$ m/s, and more preferably satisfies $0.03$ m/s $\leq v_p \leq 0.20$ m/s.

It is preferable to control the flow rate ratio of the flow rate $v_p$ of the filtrate to the flow rate $v_f$ of the feed to satisfy $0.02 \leq v_p/v_f \leq 0.3$ in all stages of the cross-flow filtration operation of the feed using the hollow fiber membrane module, and it is particularly preferable to control the flow rate ratio within this range at the initial stage of operation. As the operation is continued, the fouling proceeds, and then the transmembrane pressure difference of the hollow fiber membrane 5 in the axial direction is reduced. When the operation is performed with the flow rate ratio of the flow rate $v_p$ of the filtrate to the flow rate $v_f$ of the feed out of the above range from the initial stage of the operation, the blockage becomes fast and a relaxation speed also becomes fast, and therefore, in order to inhibit fouling, it is particularly important to control the flow rate ratio of the flow rate $v_p$ of the filtrate to the flow rate $v_f$ of the feed at the initial stage of the operation.

The flow rate $v_f$ of the feed and the flow rate $v_p$ of the filtrate can be controlled by adjusting the supply pump 14, a concentrate valve 21, and a filtrate valve 22. The flow rate $v_f$ of the feed can be adjusted by a rotational speed of the supply pump 14 and the concentrate valve 21. The flow rate $v_p$ of the filtrate is affected by the transmembrane pressure and the flow rate of the feed. Since the transmembrane pressure is a difference in pressure between the feed side space 6 and the filtrate side space 7, the transmembrane pressure can be controlled by adjusting the rotational speed of the supply pump 14 and opening degrees of the concentrate valve 21 and the filtrate valve 22. The supply pump 14, the concentrate valve 21, and the filtrate valve 22 are subjected to proportional-integral-differential (PID) control, whereby the feed flow amount and the filtrate flow amount can be kept constant.

Next, the operation method of a hollow fiber membrane module of the present invention is preferably applied to a feed having a viscosity $\mu_f$ of 3.0 mPa·s or more. In the case of a clear filtrate, the filtrate viscosity is approximately 1.0 mPa·s, and therefore, in a feed with a viscosity of 3.0 mPa·s or more, a difference from the viscosity $\mu_p$ of the filtrate occurs, and the effect of the operation method of the present invention is easily exhibited. On the other hand, when the viscosity $\mu_f$ of the feed becomes too high, the pressure loss in the feed side space 6 becomes high and the operation becomes difficult, so that it is preferably applied to the feed with a viscosity of 100.0 mPa·s or less. The present invention is preferably applied to a feed with a viscosity of 30.0 mPa·s or less, and more preferably to a feed with a viscosity of 10.0 mPa·s or less.

The feed to which the operation method of a hollow fiber membrane module according to the present invention is applied is not particularly limited, and the present invention can be applied to various feeds having a ratio $\mu_f/\mu_p$ between the viscosity $\mu_f$ of the feed and the viscosity $\mu_p$ of the filtrate of 1.5 or more. A concentration of dissolved organic carbon (DOC) is preferably 1,000 mg/L or more and 100,000 mg/L or less. When the DOC concentration is 1,000 mg/L or more, a large amount of viscosity-increasing components is contained, and the feed has a high effect of inhibiting the progress of fouling by applying the operation method of a hollow fiber membrane module of the present invention. The present invention is preferably applied to a feed having a DOC concentration of 5,000 mg/L or more, and more preferably 10,000 mg/L or more.

The DOC concentration is obtained by measuring a total organic carbon (TOC) concentration of a liquid obtained by filtering a sample through a membrane filter having a pore diameter of 0.45 µm. The TOC concentration can be measured using a TC-IC method in which inorganic carbon (IC) is subtracted from the total carbon (TC) to calculate the TOC concentration, an NPOC method in which acid is added to a sample, and then the sample is aerated, and the total carbon of a liquid after the aeration is measured to calculate the TOC concentration, or the like. When the feed contains a large amount of volatile organic carbon, the measurement is preferably performed using the TC-IC method.

The hollow fiber membrane 5 mounted on the hollow fiber membrane module of the present invention is not particularly limited as long as the filtration can be performed to satisfy the ratio $\mu_f/\mu_p$ of the viscosity $\mu_f$ of the feed to the viscosity $\mu_p$ of the filtrate of 1.5 or more, and various membranes can be applied, including those with large pore diameters, such as microfiltration membranes, ultrafiltration membranes, nanofiltration membranes, and reverse osmosis membranes. However, in the case of nanofiltration membranes and reverse osmosis membranes, the pressure loss when the feed permeates through the membrane is much larger than the pressure loss caused by the feed flow or the filtrate flow, and the influence of the pressure loss in the feed side space 6 and the filtrate side space 7 is reduced, and therefore, it is preferable to apply a microfiltration membrane or an ultrafiltration membrane. In addition, since a viscosity-increasing component for increasing the viscosity of the feed is often a high molecular weight component dissolved in the feed, it is preferable to apply an ultrafiltration membrane capable of separating the dissolved high molecular weight component.

Although there are various definitions for the microfiltration membrane and the ultrafiltration membrane, they are defined as follows in the present invention. That is, a separation membrane having a pore diameter of 0.1 µm or more and 10 µm or less is defined as a microfiltration membrane, a separation membrane having a pore diameter of less than 0.1 µm and a cutoff molecular weight of 1,000 Da or more is defined as an ultrafiltration membrane, and a separation membrane having a cutoff molecular weight of less than 1,000 Da is defined as a nanofiltration membrane and a reverse osmosis membrane.

The hollow fiber membrane 5 used in the present invention preferably has a strength (breaking load) of 500 gf/fiber or more. In the external pressure type cross-flow filtration, as an example, as shown in FIG. 1, the feed is introduced from the feed inlet port 2 of the hollow fiber membrane module 10 into the hollow fiber membrane module 10 and then discharged from the feed outlet port 4, but when the feed is discharged from the feed outlet port 4, the flow of the feed is turned by 90°. Therefore, a shearing force perpendicular to a length direction of the hollow fiber membrane 5 is applied to the hollow fiber membrane 5 in the vicinity of the feed outlet port 4.

In the present invention, it has been found that when the strength of the hollow fiber membrane 5 is 500 gf/fiber or more, it is possible to prevent breaking of the fiber, damage to the membrane, or the like with respect to shearing caused by the cross-flow flow rate assumed in the present application.

The strength refers to a load (gf) applied when the hollow fiber membrane 5 is stretched in the axial direction by a tensile tester or the like and breaks. The measured temperature at this time is the temperature of the feed during actual operation. The strength of the hollow fiber membrane 5 is preferably 600 gf/fiber or more, and more preferably 700 gf/fiber or more.

A method for measuring the strength is not particularly limited, and for example, the strength can be measured by stretching a sample with a measurement length of 50 mm at a stretching speed of 50 mm/min using a tensile tester that can control an ambient temperature, and then repeating at least 5 times with different samples to obtain an average value of breaking strength.

Furthermore, in the operation method of a hollow fiber membrane module according to the present invention, the flow rate $v_f$ of the feed and the viscosity $\mu_f$ of the feed preferably satisfy a relation of $v_f \leq -0.135\mu_f + 3.0$. The flow rate $v_f$ of the feed is a value calculated by Formula (1), and the unit thereof is m/s. The viscosity $\mu_f$ of the feed is a viscosity at an actually operating temperature, and the unit thereof is mPa·s.

With the flow rate $v_f$ of the feed satisfying $\leq -0.135\mu_f + 3.0$, it is possible to prevent the shearing force applied to the hollow fiber membrane 5 by the feed flow in the vicinity of the feed outlet port 4 from becoming larger, and it is possible to reduce the risk of breaking the fiber or damaging the membrane. Preferably, $v_f \leq -0.135\mu_f + 2.5$ is satisfied, and more preferably, $v_f \leq -0.135\mu_f + 2.3$ is satisfied.

Regarding dimensions of the hollow fiber membrane 5 loaded in the hollow fiber membrane module 10, an outer diameter $D_o$ thereof preferably satisfies 600 µm $\leq D_o \leq$ 2,000 µm. By satisfying $D_o \leq$ 2,000 µm, a membrane area per hollow fiber membrane module does not become excessively small, and the filtrate flow amount per module can be ensured. By satisfying $D_o \geq$ 600 µm, a contact area between the feed and the hollow fiber membrane increases, and thus it is possible to prevent an excessive increase in pressure loss in the feed side space. The outer diameter $D_o$ preferably satisfies 900 µm $\leq D_o \leq$ 1,800 µm, and more preferably satisfies 1000 µm $\leq D_o \leq$ 1,500 µm.

An inner diameter $D_i$ of the hollow fiber membrane 5 preferably satisfies 300 µm $\leq D_i \leq$ 1,000 µm. By satisfying 300 µm $\leq D_i \leq$ 1,000 µm, the pressure loss in the filtrate side space 7 can be controlled to an appropriate range, and the trans-membrane pressure difference in the length direction of the hollow fiber membrane 5 can be reduced. It is preferable that $D_i$ satisfies 400 µm $\leq D_i \leq$ 900 µm, and more preferable that $D_i$ satisfies 500 µm $\leq D_i \leq$ 800 µm.

The outer diameter $D_o$ and the inner diameter $D_i$ of the hollow fiber membrane 5 are measured by cutting the hollow fiber membrane 5 by a plane perpendicular to the axial direction with a single-edge or the like, observing the cross section with a microscope or the like, and measuring diameters of an inner circle and an outer circle. When the outer circle or the inner circle is flat, a length (long diameter) of a portion having the longest diameter and a length (short diameter) of a portion having the shortest diameter are measured, and the diameter is calculated by averaging the two. Preferably, the hollow fiber membranes 5 loaded in the hollow fiber membrane module 10 are arbitrarily cut, and average values of the outer diameters and the inner diameters of 10 or more hollow fiber membranes are used.

A filling rate M of the hollow fiber membranes 5 loaded in the hollow fiber membrane module 10 preferably satisfies 25% $\leq$ M $\leq$ 45%. By satisfying 25% $\leq$ M $\leq$ 45%, the pressure loss on the feed side can be controlled to an appropriate range while ensuring the membrane area per module. The filling rate M preferably satisfies 28% $\leq$ M $\leq$ 42%, more preferably satisfies 30% $\leq$ M $\leq$ 40%.

The filling rate M is calculated by the following Formula (6) from an inner diameter $D_c$ of the container 1, the outer diameter $D_o$ of the hollow fiber membrane 5, and the number N of the hollow fiber membranes 5. When there is a member existing in the feed side space 6 other than the hollow fiber membranes 5 in the container 1, a cross-sectional area of the member perpendicular to the axial direction of the container 1 is calculated and added to an occupied area $S_p$ of the hollow fiber membranes 5.

[Formula 6]

$$M = \frac{\pi (D_0/2)^2 N}{\pi (D_c/2)^2} \times 100 \qquad (6)$$

The membrane length L is a length in a direction parallel to the container 1 of a portion actually used for filtration in a state where the hollow fiber membranes 5 are loaded in the container 1, that is, a portion where the outer surfaces of the hollow fiber membranes 5 are in contact with the feed. In FIG. 1, it is a length of a hollow fiber membrane among the hollow fiber membrane 5 from an end surface of the first potting portion 8 on the second potting portion side to an end surface of the second potting portion 9 on the first potting portion side. The length of the hollow fiber membrane embedded in the first potting portion 8 and the second potting portion 9 is not considered here.

In the present invention, the membrane length L preferably satisfies 0.50 m≤L≤2.00 m. By satisfying 0.50 m≤L≤2.00 m, it is possible to prevent the pressure loss in the feed side space 6 from becoming excessively large and to inhibit the progress of fouling while ensuring the membrane area of the hollow fiber membrane module. The membrane length L preferably satisfies 0.70 m≤L≤1.50 m, and more preferably satisfies 0.80 m≤L≤1.20 m.

In the case of a hollow fiber membrane module in which the hollow fiber membrane 5 is loaded in a so-called U-shape and is embedded in only the second potting portion 9 in a state where both ends are open, the membrane length L is half of the length of the hollow fiber membrane actually used for filtration, that is, half of the length of the fiber in a portion where the outer surface of the hollow fiber membrane is in contact with the feed.

In the case where the first potting portion 8 is not provided and the feed inlet port side end of the hollow fiber membrane 5 is a free end, the membrane length L is a length from a portion in the free end which is not subjected to sealing processing by an adhesive or heat to an end surface of the second potting portion 9 on the feed inlet port side.

Even when the hollow fiber membrane 5 is crinped or twisted, the membrane length L may be measured as a length in a direction parallel to the container 1 of a portion of the hollow fiber membrane actually used for filtration, that is, a portion where the outer surface of the hollow fiber membrane is in contact with the feed.

Next, the operation method of a hollow fiber membrane module according to the present invention preferably further includes, in addition to the above-described filtration step, a backwashing step of flowing a cleaning liquid from the inner surface side to the outer surface side of the hollow fiber membrane, and it is preferable that a surface pore diameter $\varphi_o$ of the outer surface of the hollow fiber membrane satisfies 0.005 µm≤$\varphi_o$≤0.02 µm, and a ratio of a surface pore diameter $\varphi_i$ of the inner surface of the hollow fiber membrane to the surface pore diameter $\varphi_o$ of the outer surface satisfies $\varphi_i/\varphi_o$>50.

In general, in the filtration operation, components larger than pores on the surface of the hollow fiber membrane are deposited on the surface of the hollow fiber membrane 5. Components contained in the feed and smaller than the pores on the surface of the hollow fiber membrane enter into the pores. Accordingly, clogging occurs on the membrane surface and inside the membrane. In the external pressure type cross-flow filtration, components accumulated on the membrane surface are removed by the flow generated by the cross-flow filtration operation.

In order to eliminate clogging inside the membrane, a backwashing step of flowing a cleaning liquid from the inner surface side toward the outer surface side of the hollow fiber membrane is preferably performed. The backwashing step is a step of passing the cleaning liquid through the filtrate side space 7 of the hollow fiber membrane module 10 from a filtrate tank 13 using, for example, a compressed gas or a pump, and discharging the cleaning liquid flowing out to the feed side space 6 to the outside of the hollow fiber membrane module 10.

However, it is difficult to remove all the components that enter the inside of the membrane only by backwashing, and it is necessary to perform cleaning with chemicals because clogging of the membrane progresses in a long period of operation. Cleaning with chemicals induces deterioration in the strength of the membrane, which prevents the membrane from being used for a long period of time.

Furthermore, in the case where the viscosity of the filtrate is lower than that of the feed as in the present invention, particularly when clogging components in the feed are held in the feed side space by the hollow fiber membrane and adhere to the membrane surface, the clogging components are easily accumulated mainly on the membrane surface and in the pores in the vicinity of the surface.

In response to this problem, as a result of intensive studies, it has been found that, in a hollow fiber membrane module that performs the external pressure type cross-flow filtration, by using a hollow fiber membrane in which the pore diameter of the outer surface of the hollow fiber membrane and the ratio between the pore diameters of the inner surface and the outer surface are controlled, the effect of backwashing is particularly good, and stable filtration for a long period is possible.

The surface pore diameter $\varphi_o$ of the outer surface of the hollow fiber membrane preferably satisfies 0.005 µm≤$\varphi_o$≤0.02 µm. By satisfying 0.005 µm≤$\varphi_o$≤0.02 µm, it is possible to prevent the intrusion of the clogging components into the membrane while having a pore diameter capable of ensuring a necessary filtrate amount. The pore diameter $\varphi_o$ more preferably satisfies 0.005 µm≤$\varphi_o$≤0.009 µm, and particularly preferably satisfies 0.005 µm≤$\varphi_o$≤0.008 µm.

The surface pore diameter in the present invention is obtained by the following method. Images obtained by observing the outer surface and the inner surface of the hollow fiber membrane with a scanning electron microscope (SEM) or a transmission electron microscope (TEM) is binarized using free software "ImageJ". During binarization, after Create Background is performed by Subtract Background with 1 pixel, Condition: Renyi Entropy is selected in Threshold (threshold for binarization). In the obtained binarized images, an area of each pore is obtained by selecting Area in Analyze Particles, and the diameter is calculated on the assumption that each pore is a circle. The surface pore diameter is obtained by averaging pore diameters of one hundred pores or more.

In a case where there is unevenness on the surface and it is difficult to sort the pores by binarization, the surface pore diameter may be obtained from a cross-sectional pore diameter described later. In this case, a cross-sectional pore diameter within a depth of 20 µm from the surface is defined as the surface pore diameter.

It is preferable that the ratio $\varphi_i/\varphi_o$ of the pore diameter $\varphi_i$ of the inner surface which is the surface of the hollow fiber membrane in contact with the filtrate to the pore diameter $\varphi_o$ of the outer surface which is the surface of the hollow fiber membrane in contact with the feed (the ratio of the pore diameter $\varphi_i$ of the inner surface to the pore diameter of the outer surface $\varphi_o$) satisfies $\varphi_i/\varphi_o$>50. By satisfying $\varphi_i/\varphi_o$>50, the flow rate of the cleaning liquid in the vicinity of the membrane surface can be increased, and the cleaning effect in the vicinity of the surface can be particularly enhanced even in the case of a feed having a difference in viscosity between the feed and the filtrate, in which clogging components are likely to accumulate on the membrane surface or in the pores in the vicinity of the surface. It is preferable that $\varphi_i/\varphi_o$>60 is satisfied, and it is particularly preferable that $\varphi_i/\varphi_o$>70 is satisfied. An upper limit of $\varphi_i/\varphi_o$ is not particularly limited, and is, for example, 1000 or less, preferably 700 or less, since the larger the value of $\varphi_i/\varphi_o$, the higher cleaning recovery performance of the hollow fiber membrane by the backwashing.

The cleaning liquid used in the backwashing step is preferably a liquid having a lower viscosity than the feed, such as pure water or a filtrate, so as to easily exhibit the cleaning effect. The backwashing step can be performed during the cross-flow filtration operation or after stopping the cross-flow filtration operation, or the like, and the frequency of the backwashing step may be appropriately set depending on the situation during the operation.

The hollow fiber membrane 5 of the present invention may be a single-layer hollow fiber membrane, but a composite hollow fiber membrane in which two or more layers are laminated is preferable since $\varphi_i/\varphi_o$ easily takes a large value. In this case, a transmission coefficient $Lp_o$ of the layer on the outer surface side and a transmission coefficient $Lp_i$ of the layer on the inner surface side preferably satisfy $Lp_i \geq Lp_o$. A transmission coefficient Lp is an index of ease of passage of water, is represented by the following Formula (7), and shows that the larger the transmission coefficient is, the easier it is for water to pass through, and the smaller the transmission coefficient is, the more difficult it is for water to pass through. Formula (7) is described in, for example, Journal of Chemical Engineering of Japan (Vol. 15, No. 3 (1982) pp. 200-205). In the above-described document, the cross-sectional pore diameter is expressed by a radius instead of a diameter, and a porosity is expressed by an opening ratio, but they are used in the same meaning. Note that a pure water transmissivity K, which will be described later, is an index of the ease of passage of water, similarly to the transmission coefficient Lp, and the pure water transmissivity K is calculated from a measurement result of water transmissivity, whereas the transmission coefficient Lp is calculated from a micro structure of a separation membrane. The transmission coefficient Lp is used only for comparing the ease of passage of water in each layer.

[Formula 7]

$$L_p = \frac{\varphi^2 A}{32 \mu H} \quad (7)$$

Here, $\varphi$ is a cross-sectional pore diameter (μm), and A is a porosity (−), and μ is a viscosity (Pa·s) of water, and H is a thickness (μm).

When the transmission coefficient $Lp_i$ of the layer on the inner surface side is larger than the transmission coefficient $Lp_o$ of the layer on the outer surface side, during backwashing, the pressure loss of the cleaning liquid passing through the layer on the inner surface side can be reduced, and the pressure acting on the layer on the outer surface side where the clogging components are easily accumulated can be increased, and the cleaning effect is enhanced.

The cross-sectional pore diameter of the present invention can be determined by the following method. A cross section sample for observation is obtained by embedding a hollow fiber membrane using a commercially available embedding agent for frozen tissue section preparation, collecting a section of a porous membrane having a thickness of 100 nm at a low temperature using a cryo ultramicrotome, and performing vacuum drying overnight at room temperature. A cross section of the hollow fiber membrane is observed with a scanning electron microscope (SEM) or a transmission electron microscope (TEM) to obtain an image of each layer. When a structure of a layer is symmetric in a membrane thickness direction, an image of a central portion of the layer is acquired, and when the structure of the layer is asymmetric in the membrane thickness direction, an image of a region having the densest pore diameter is acquired. Then, binarization is performed using free software "ImageJ". In the binarization, a condition: Minimum is selected in Threshold (threshold for binarization). In the obtained binarized images, an area of each pore is obtained by selecting Area in Analyze Particles, and the diameter is calculated on the assumption that each pore is a circle. The cross-sectional pore diameter is obtained by averaging the pore diameters of hundred or more pores.

The porosity A can also be obtained from the binarized image of the cross section of the hollow fiber membrane described above, and the porosity is calculated by dividing the total value of the calculated areas of the pores by a total area including the hollow fiber membrane in the observed image.

Note that in the present invention, the transmission coefficient Lp is calculated in regions with an interval of 10 μm in the membrane thickness direction, and the cross-sectional pore diameter and the void also use values calculated in regions with an interval of 10 μm. For the transmission coefficient Lp when the structure of each layer is symmetrical in the membrane thickness direction, the transmission coefficient Lp calculated in a region positioned at a center of each layer in the membrane thickness direction is used as Lp of the layer, and for the transmission coefficient Lp when the structure of each layer is asymmetric in the membrane thickness direction, the transmission coefficient Lp calculated in a region having the densest cross-sectional pore diameter in the membrane thickness direction is used as Lp of the layer.

A thickness $H_o$ of the layer having a small transmission coefficient on the outer surface side and a thickness $H_i$ of the layer having a large transmission coefficient on the inner surface side preferably satisfy $H_o/H_i \leq 1.0$. By satisfying $H_o/H_i \leq 1.0$, the pressure loss generated in the layer having a small transmission coefficient can be reduced. As a result, the pressure acting on the layer on the outer surface side where the clogging components are easily accumulated can be increased, and the cleaning effect is enhanced. When $H_o/H_i$ is too small, a separation function for blocking the viscosity-increasing components is deteriorated, and therefore, $0.04 \leq H_o/H_i \leq 0.5$ is preferable, and $0.1 \leq H_o/H_i \leq 0.4$ is more preferable.

As a layer having a small pore diameter and a small transmission coefficient on the outer surface side, a three-dimensional network structure layer in which fine pores are easily formed is suitable. On the other hand, as a layer having a large pore diameter and a large transmission coefficient on the inner surface side, a spherical structure layer having a high strength in which coarse pores are easily formed is suitable. Therefore, it is preferable that in the composite hollow fiber membrane constituted by two layers, a spherical structure layer is provided on the inner surface side, and a three-dimensional network structure layer is provided on the outer surface side.

In the composite hollow fiber membrane in which the spherical structure layer is provided on the inner surface side and the three-dimensional network structure layer is provided on the outer surface side, a thickness of the three-dimensional network structure layer is preferably 20 μm or more and 120 μm or less, and more preferably 30 μm or more and 80 μm or less from the viewpoint of the cleaning effect and an blocking property of the viscosity-increasing components described above. When the thickness of the three-dimensional network structure layer is less than 20 µm, a blocking rate of the viscosity-increasing components may decrease. When the thickness is more than 120 µm, transmission resistance becomes too large, which may cause a decrease in the cleaning effect and a decrease in the water transmissivity.

The thickness of the spherical structure layer is also preferably 120 µm or more and 500 µm or less, and more preferably 200 µm or more and 300 µm or less, from the viewpoint of the cleaning effect and the viewpoint of the strength and water transmissivity of the hollow fiber membrane described above.

A liquid-liquid type thermally induced phase separation method or a nonsolvent induced phase separation method described later can be used for forming the three-dimensional network structure layer, and a solid-liquid type thermally induced phase separation method can be used for forming the spherical structure layer.

Examples of the high molecular which is the material of the hollow fiber membrane 5 include olefin polymers such as polyethylene, ethylene-propylene copolymer, ethylene-acrylic acid ethyl copolymer, ethylene-vinyl acetate copolymer, ionomer, polypropylene, and poly-4-methyl pentene-1, fluorine-containing polymers such as polytetrafluoroethylene, polychlorotrifluoroethylene, polyvinylidene fluoride, tetrafluoroethylene-ethylene copolymer, and tetrafluoroethylene-perfluoroalkyl vinyl ether copolymer, cellulose polymers such as cellulose acetate, polyvinyl chloride, acrylonitrile polymers, silicone polymers, polyamide, polyimide, polyethersulfone, polysulfone, polyphenylene oxide, polyphenylene sulfide, polyarylate, polyether ether ketone, polyether imide, polycarbonate, and polyvinyl alcohol-based polymer. In order to enhance heat resistance, physical strength, and chemical durability of the hollow fiber membrane to be obtained, fluororesin-based high molecular, polyethersulfone, or polysulfone are preferable, and in the hollow fiber membrane module for cross-flow filtration in which the load applied to the membrane is large, the fluororesin-based high molecular having excellent strength is preferable.

In order to reduce fouling of the hollow fiber membranes 5, hydrophilic high molecular may be contained. Specific examples thereof include polymers containing vinyl alcohol, ethylene glycol, vinyl pyrrolidone, methacrylic acid, allyl alcohol, cellulose, and vinyl acetate. Furthermore, examples of the copolymer containing a hydrophilic group include polyvinyl alcohol, vinyl pyrrolidone-vinyl acetate copolymer, vinyl pyrrolidone-vinyl caprolactam copolymer, and vinyl pyrrolidone-vinyl alcohol copolymer, which have a saponification degree of less than 99%.

A method for producing a hollow fiber membrane module according to the present invention will be described below.
(Method for Producing Hollow Fiber Membrane)

As an example of the method for producing a hollow fiber membrane according to the present invention, a method for producing a hollow fiber membrane using a fluororesin-based high molecular will be shown. Various methods such as a thermally induced phase separation method and a nonsolvent induced phase separation method can be used as the method for producing a hollow fiber membrane using a fluororesin-based high molecular. Hereinafter, a production method using a thermally induced phase separation method will be described.

The fluororesin-based high molecular is dissolved in a poor solvent or a good solvent of the fluororesin-based high molecular at a relatively high temperature equal to or higher than a crystallization temperature to prepare a fluororesin-based high molecular solution (that is, a membrane producing raw liquid containing the fluororesin-based high molecular).

When a high molecular concentration in the membrane producing raw liquid is high, a porous hollow fiber membrane having high strength is obtained. On the other hand, when the high molecular concentration is low, the porosity of the porous hollow fiber membrane increases, and the pure water transmissivity is improved. Therefore, a concentration of the fluororesin-based high molecular is preferably 20 wt % or more and 60 wt % or less, and more preferably 30 wt % or more and 50 wt % or less.

In the present description, the poor solvent refers to a solvent that cannot dissolve the fluororesin-based high molecular at 5 wt % or more at a low temperature of 60° C. or less, but can dissolve the fluororesin-based high molecular at 5 wt % or more in a high temperature range of 60° C. or more and a melting point of the fluororesin-based high molecular (for example, approximately 178° C. in a case where the high molecular is composed of a vinylidene fluoride homopolymer alone) or less. The good solvent refers to a solvent capable of dissolving the fluororesin-based high molecular at 5 wt % or more even in a low temperature range of less than 60° C., and the nonsolvent is defined as a solvent that does not dissolve or swell the fluororesin-based high molecular up to the melting point of the fluororesin-based high molecular or a boiling point of the solvent.

Here, examples of the poor solvent of the fluororesin-based high molecular include cyclohexanone, isophorone, γ-butyrolactone, methyl isoamyl ketone, propylene carbonate, dimethyl sulfoxide, and mixed solvents thereof. Examples of the good solvent include N-methyl-2-pyrrolidone, dimethylacetamide, dimethylformamide, methylethyl ketone, acetone, tetrahydrofuran, tetramethylurea, trimethyl phosphate, and mixed solvents thereof. Examples of the nonsolvent include water, aliphatic hydrocarbons such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, and low molecular weight polyethylene glycol, aromatic hydrocarbons, aliphatic polyhydric alcohols, aromatic polyhydric alcohols, chlorinated hydrocarbons, and other chlorinated organic liquids and mixed solvents thereof.

In a forming step of a hollow fiber membrane, a hollow fiber membrane is obtained from a membrane producing raw liquid containing a fluororesin-based high molecular by using a thermally induced phase separation method in which phase separation is induced by temperature change. In the thermally induced phase separation method, two types of phase separation mechanisms are mainly used. One is a liquid-liquid phase separation method in which a high molecular solution uniformly dissolved at a high temperature is separated into a high molecular concentrated phase and a high molecular dilute phase due to a decrease in solubility of the solution during temperature drop, and then a structure thereof is fixed by crystallization. The other is a solid-liquid phase separation method in which a high molecular solution uniformly dissolved at a high temperature undergoes crystallization of the high molecular during temperature drop and is phase-separated into a high molecular solid phase and a solvent phase.

The former method mainly forms a three-dimensional network structure, and the latter method mainly forms a spherical structure constituted by a spherical tissue. Although the phase separation mechanism is not particularly specified in the production of the hollow fiber membrane of the present invention, the latter phase separation mechanism is preferably used for a hollow fiber membrane for cross-flow filtration which requires strength. Accordingly, a high molecular concentration and a solvent at which solid-liquid phase separation is induced are selected.

As a specific method, a hollow portion formation liquid is discharged from a tube on an inner side of a double tube type spinneret for spinning the porous hollow fiber membrane while the above-described membrane producing raw liquid is discharged from a tube on an outer side of the double tube type spinneret. The thus discharged membrane producing raw liquid is cooled and solidified in a cooling bath to obtain a porous hollow fiber membrane.

Next, the cooling bath for cooling the fluororesin-based high molecular solution discharged from the spinneret will be described. For the cooling bath, it is preferable to use a mixed liquid including a poor solvent or a good solvent having a concentration of 50 wt % to 95 wt % and a nonsolvent having a concentration of 5 wt % to 50 wt %. Further, as the poor solvent, the same poor solvent as in the high molecular solution is preferably used. In the hollow portion formation liquid, it is preferable to use a mixed liquid including a poor solvent or a good solvent having a concentration of 50 wt % to 95 wt % and a nonsolvent having a concentration of 5 wt % to 50 wt %, similarly to the cooling bath. Further, as the poor solvent, the same poor solvent as in the high molecular solution is preferably used. A hollow fiber membrane made of a fluororesin-based high molecular obtained by the above method may be stretched. A stretching ratio and a stretching temperature are appropriately selected according to a desired pore diameter, dimension, and pure water transmissivity.

In the case of obtaining the hollow fiber membrane to be loaded in the hollow fiber membrane module of the present invention, the inner and outer diameters of the hollow fiber membrane can be controlled mainly by adjusting a spinneret diameter of the double tube type spinneret and discharge amounts of the membrane producing raw liquid and the hollow portion formation liquid. That is, a hollow fiber membrane having large inner and outer diameters can be obtained by using a double tube type spinneret having a large diameter or by increasing the discharge amounts of the membrane producing raw liquid and the hollow portion formation liquid. The dimension can also be adjusted by changing the stretching ratio and the stretching temperature.

Examples of a method for obtaining a composite hollow fiber membrane include a method of simultaneously forming a plurality of layers and a method of sequentially forming another layer on a single layer of hollow fiber membrane. Examples of the former method include a method of performing composite molding of a plurality of resin solutions using a multi-tube type spinneret. Examples of the latter method include a method in which a resin solution for forming another layer is applied to a hollow fiber membrane obtained after the above step, and then the hollow fiber membrane is scraped by a nozzle or a slit coater to form, and a method in which a resin solution for forming another layer is spray-coated. Among them, a method of applying a resin solution for forming another layer, and then scraping and solidifying the hollow fiber membrane is simple and preferable.

In the production of the composite separation membrane by the above method, the resin solution for forming another layer is not particularly limited, and when the purpose is to modify or densify the surface of the separation membrane, a three-dimensional network structure is preferably used. In the case of a composite separation membrane constituted by a spherical structure and a three-dimensional network structure, a nonsolvent induced phase separation method can be used to form the three-dimensional network structure. Here, the nonsolvent induced phase separation is phase separation in which the resin solution is solidified by being brought into contact with a nonsolvent.

When the nonsolvent induced phase separation method is used, as a solvent of the resin solution, a good solvent of the resin is preferable, and examples of the good solvent of the polyvinylidene fluoride-based resin include lower alkyl ketones, esters, amides, and the like such as N-methyl-2-pyrrolidone, dimethylacetamide, dimethylformamide, methyl ethyl ketone, acetone, and tetrahydrofuran, and mixed solvents thereof. Here, the good solvent refers to a solvent capable of dissolving the polyvinylidene fluoride-based resin to 5 wt % or more even at a low temperature of less than 60° C.

The nonsolvent is defined as a solvent that does not dissolve or swell the polyvinylidene fluoride-based resin up to a melting point of the polyvinylidene fluoride-based resin or a boiling point of the solvent. Here, examples of the nonsolvent of the polyvinylidene fluoride-based resin include water, aliphatic hydrocarbons such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, and low molecular weight polyethylene glycol, aromatic hydrocarbons, aliphatic polyhydric alcohols, aromatic polyhydric alcohols, chlorinated hydrocarbons, and other chlorinated organic liquids and mixed solvents thereof.

(Production of Hollow Fiber Membrane Module)

Types of the hollow fiber membrane module are classified into a container-integrated module in which the container 1 and the hollow fiber membrane 5 are fixed by an adhesive and a cartridge type module in which the container 1 and the hollow fiber membrane 5 are not fixed by an adhesive and the hollow fiber membrane 5 is attachable to and detachable from the container 1.

In the container-integrated module, a plurality of hollow fiber membranes 5 are inserted into the container 1, and the container 1 is fixed to the ends of the hollow fiber membranes 5 with an adhesive. In the cartridge type module, the hollow fiber membranes are inserted into a dedicated fixture or the like, and the membranes are adhered to each other with an adhesive, and are not fixed to the container 1.

In either method, the hollow fiber membrane 5 is inserted into a fixture or a container, or into both, and an adhesive is poured for fixing. Examples of a method for filling a gap between the hollow fiber membranes with the adhesive include a centrifugal potting method in which a potting agent is permeated by using a centrifugal force, and a static potting method in which the adhesive is permeated by natural flowing. The adhesive may be injected into a mold for casting to fill the gap between the hollow fiber membranes.

In the case of opening the hollow fiber membrane end fixed by the adhesive, the end of the hollow fiber membrane 5 is sealed in advance so that the adhesive does not flow into the hollow portion in the hollow fiber membrane when the adhesive is poured, and is fixed by the adhesive. Examples of the sealing method include a method of injecting an adhesive only into the hollow portion and a method of welding with heat or a solvent. After the hollow fiber membrane 5 in which the end is sealed is fixed with an adhesive, the other end side from a sealed portion is cut in a cross-sectional direction of the hollow fiber membrane 5, and thus the hollow fiber membrane end can be opened. In the case where the hollow fiber membrane ends are fixed with an adhesive without being sealed, the adhesive flows into the hollow portions of the hollow fiber membranes 5, so that the ends of the hollow fiber membranes are sealed.

In the present invention, a method of fixing both ends of the hollow fiber membrane 5 with an adhesive may be adopted, but the feed inlet port side end of the hollow fiber membrane 5 may be a free end which is not fixed with an adhesive.

(Pressure Distribution Simulation of Hollow Fiber Membrane Module)

In order to verify an effect of the operation method of a hollow fiber membrane module according to the present invention, the pressure distribution in the hollow fiber membrane module was simulated to examine a range that could not be examined by experiments.

Figure 3:
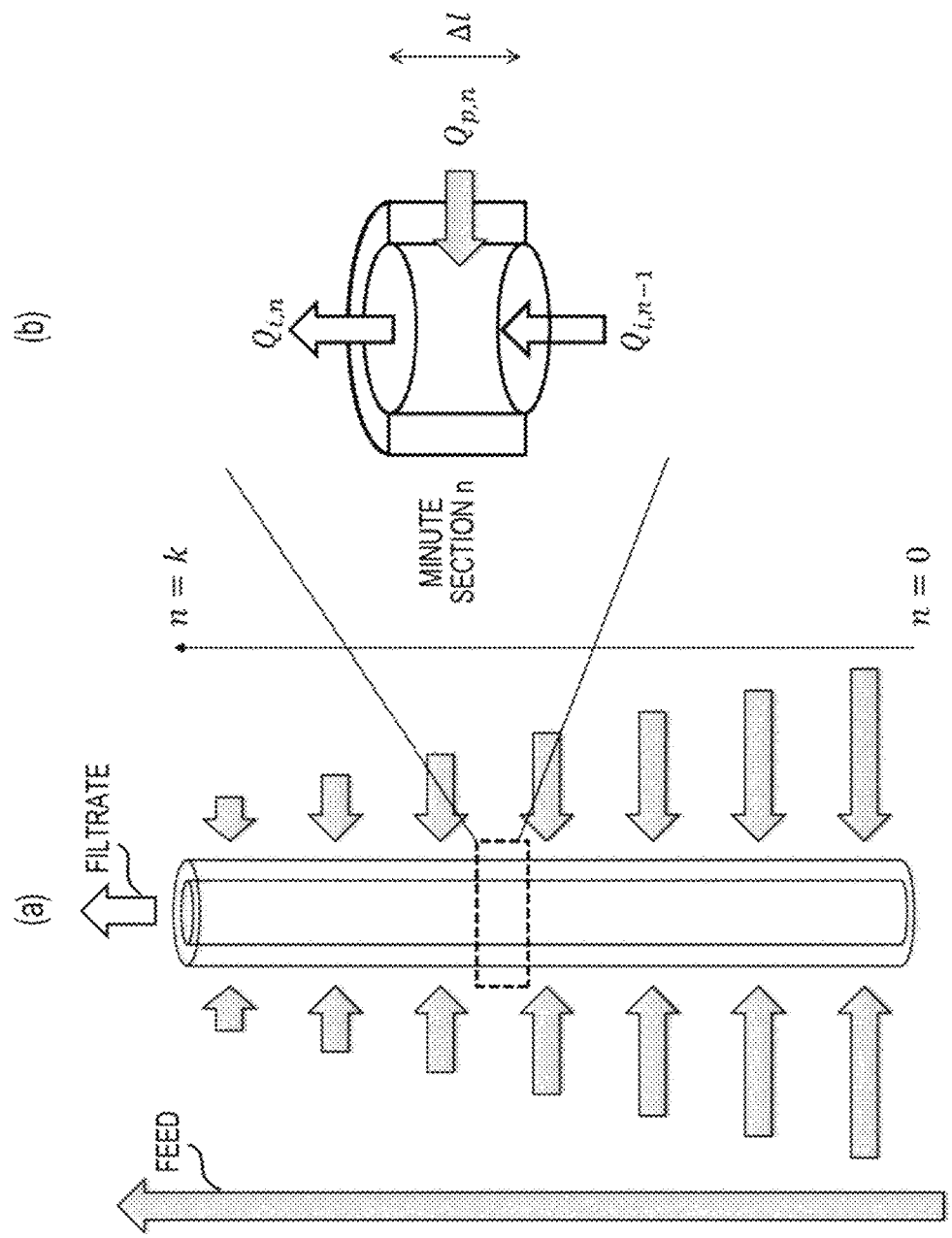
FIG. 3 is a schematic view showing a model for simulating pressure distribution in the hollow fiber membrane module.

FIG. 3 shows an overview of a model for simulation. In FIG. 3, (a) shows one hollow fiber membrane 5 and flows of the feed and the filtrate. In FIG. 3, the feed is indicated by shaded arrows, and the filtrate is indicated by white arrows. It is assumed that n=0 for the feed inlet port side end of the hollow fiber membrane 5, and n=k for the position of the filtrate outlet port side end. In the hollow fiber membrane 5, the feed inlet port side end is sealed and the filtrate outlet port side end is open, and all the filtrate is discharged from the filtrate outlet port side end. Here, the flow of the liquid in a minute section n when the hollow fiber membranes 5 are meshed in the axial direction by Δl is shown in (b) of FIG. 3. Here, n is an integer of 0 or more, and k is a natural number of 1 or more. In the minute section n, the filtrate discharged from the minute section n−1 merges with the filtrate filtered by the membrane in the minute section n. As a result, the filtrate flow amount $Q_{i,n}$ discharged from the minute section n is expressed by the following Formula (8), where the filtrate amount discharged from the minute section n−1 is assumed as $Q_{i,n-1}$, and the filtrate amount filtered by the membrane in the minute section n is assumed as $Q_{p,n}$. Note that $Q_{i,-1}$ does not exist, and $Q_{i,0}=Q_{p,0}$. K is preferably 50 or more, and more preferably 100 or more. The membrane length from the feed inlet port side end to the minute section n is defined as $l_n$. Here, $l_0=0$, and $l_k=L$.

[Formula 8]
$$Q_{i,n} = Q_{i,n-1} + Q_{p,n} \qquad (8)$$

The filtrate flow amount $Q_{p,n}$ in the minute section n is calculated by the following Formulas (9) to (11) from a feed side pressure $P_{o,n}$ and a filtrate side pressure $P_{i,n}$ in the minute section n, a membrane area $A_n$, a membrane filtration resistance $R_n$, and the viscosity $\mu_p$ of the filtrate at the temperature at which filtration is performed. $R_n$ is calculated from a filtration flux J (=permeation amount (m³)/filtration time (hr)/effective membrane area (m²)), the transmembrane pressure $\Delta P_m$, and the viscosity $\mu$ when the pure water transmissivity K is measured by a miniature module, and it is assumed to be uniform in the axial direction of the hollow fiber membrane 5 at an initial stage of the filtration.

[Formula 9]
$$Q_{p,n} = \frac{(P_{o,n} - P_{i,n})A_n}{\mu_p R_n} \qquad (9)$$

[Formula 10]
$$A_n = \pi D_0 \Delta l \qquad (10)$$

[Formula 11]
$$R_n = \frac{\Delta P_m}{\mu J} \qquad (11)$$

The feed side pressures $P_{o,n}$ in the minute section n is calculated by the following Formula (12) in consideration of a feed inlet pressures $P_{o,0}$ and a pressure loss $\Delta P_o \times l_n$ caused by the feed flow. Actually, since a part of the feed is filtered by the membrane, the circulation flow amount changes in the axial direction of the hollow fiber membrane 5, but since the filtered flow amount is small as compared with the circulation flow amount, it can be ignored. Therefore, in the present model, the pressure loss $\Delta P_o$ per unit length in the axial direction caused by the feed flow is calculated to be constant regardless of position.

[Formula 12]
$$P_{o,n} = P_{o,0} - \Delta P_o l_n \qquad (12)$$

For the pressure loss $\Delta P_o$ per unit length, the pressure loss $\Delta P_o$ is calculated from the equivalent diameter $D_e$ of the feed side space 6 and the viscosity $\mu_f$ of the feed by the following Formulas (13) and (14). Note that ρ is a feed density, $D_c$ is a diameter of an inner circle of the container 1, and τ is a shape correction coefficient of a feed side flow channel.

[Formula 13]
$$Re_o = \frac{\rho D_e v_f}{\mu_f} \qquad (13)$$

[Formula 14]
$$\Delta P_o = \tau \frac{32}{Re_o} \frac{1}{D_e} \rho v_f^2 \qquad (14)$$

The filtrate side pressure $P_{i,n}$ in the minute section n is calculated from the pressure loss when flowing through the inside of the hollow fiber membrane 5. Here, the Reynolds number $Re_{i,n}$ of the filtrate flowing through the inside of the hollow fiber membrane 5 is calculated, and the pressure loss from the minute section n to the filtrate outlet port side end is integrated to be calculated. $V_{p,n}$ is a flow rate of the filtrate in the minute section n. Here, a calculation method in a case where the flow flowing through the inside is a laminar flow is shown in the following Formulas (15) and (16).

[Formula 15]
$$Re_{i,n} = \frac{\rho D_i v_{p,n}}{\mu_p} \qquad (15)$$

[Formula 16]
$$P_{i,n} = \int_n^k \frac{32}{Re_{1,n}} \frac{\Delta l}{D_i} \rho v_{p,n}^2 + P_{i,k} \qquad (16)$$

Here, for the sake of convenience, by setting $P_{i,k}=0$ and adjusting $P_{o,0}$ so that the filtrate flow amount $Q_{i,k}$ obtained from the hollow fiber membrane 5 satisfies the following Formula (17), the pressure distribution on the feed side and the filtrate side of the hollow fiber membrane 5 is calculated. Note that $J_t$ indicates a set filtration flux.

[Formula 17]

$$\frac{Q_{i,k}}{\pi D_o L} = J_t \quad (17)$$

From the pressure distribution thus calculated, a difference between the feed side pressure $P_{o,n}$ and $P_{i,n}$ in the minute section n is a transmembrane pressure $\Delta P_{m,n}$ in this section. In the operation method of a hollow fiber membrane module according to the present invention, $\Delta P_{m,k}-\Delta P_{m,0}$, which is a transmembrane pressure difference in the axial direction of the hollow fiber membrane 5, is preferably 50 kPa or less.

EXAMPLES

Hereinafter, the present invention will be described with reference to specific examples, but the present invention is not limited to these examples. Note that various parameters relating to the present invention were measured using the above-described methods.

(Measurement of Pure Water Transmissivity)

The pure water transmissivity K was measured by preparing a miniature module including three hollow fiber membranes having a membrane length of 0.1 m. Under conditions of a temperature of 25° C. and a filtration differential pressure of 16 kPa, external pressure type dead-end filtration of a reverse osmosis membrane filtrate was performed for 10 minutes to determine a permeation amount (m³). The permeation amount (m³) was converted into a value per unit time (h) and per effective membrane area (m²), and the value was further multiplied by (50/16) to be converted into a value at a pressure of 50 kPa, thereby obtaining the pure water transmissivity K. In the present invention, the effective membrane area is an area of a portion of the outer surface of the hollow fiber membrane 5 actually used for filtration operation.

(Measurement of Strength)

The strength was measured by testing a sample having a measurement length of 50 mm five times or more using a tensile tester (TENSILON®/RTM-100, manufactured by TOYO BALDWIN) in an atmosphere at 25° C. and at a stretching speed of 50 mm/min with changing the sample, and then obtaining an average value.

(Measurement of Viscosity)

Figure 4:
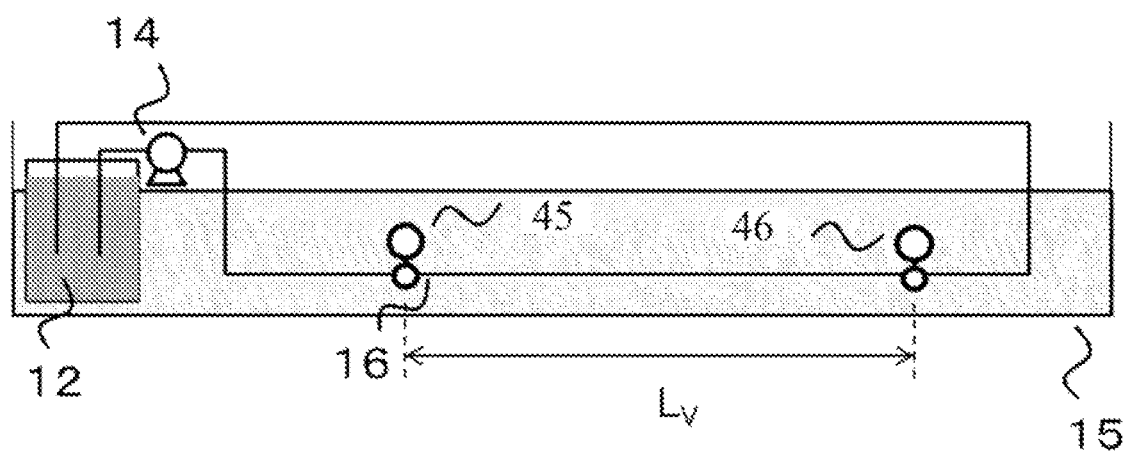
FIG. 4 is a schematic flow diagram showing an embodiment of viscosity measurement using a capillary viscometer.

The apparatus shown in FIG. 4 was used to measure the viscosity. A feed tank 12 and a fine tube 16 were disposed in a constant-temperature-water bath 15, and were connected by a fluorine tube such that the feed can be sent to and returned from the fine tube 16. A fluorine tube having an inner diameter of 2.0 mm and a tube length of 1.0 m was used as the fine tube 16. A tube inlet pressure gauge 45 and a tube outlet pressure gauge 46 were connected to both ends of the fine tube, respectively. The constant-temperature-water bath 15 was filled with water, and the temperature of the feed was adjusted to the same temperature as that during actual operation.

Thereafter, the shear speed was obtained from the flow channel diameter $D_e$ of the hollow fiber membrane module used in the actual operation and the flow rate $v_y$, and a flow rate $v_y$ of the feed to be sent to the fine tube was set so that the shear speed was equivalent to the shear speed $\gamma$ of an actual module. The feed was sent at the set flow rate $v_y$, and the viscosity was calculated from measured tube inlet pressure P1 and tube outlet pressure P2 using Formula (5).

(Measurement of Pore Diameter)

The hollow fiber membrane was vacuum-dried overnight at 25° C., and then observed at a magnification of 30,000 to 100,000 times using an SEM (S-5500, manufactured by Hitachi High-Technologies Corporation). An image obtained by using SEM to observe the surface of the porous membrane was binarized using free software "ImageJ". During binarization, after Create Background was performed by Subtract Background with 1 pixel, Condition: Renyi Entropy was selected in Threshold (threshold for binarization). In the obtained binarized images, an area of each pore was obtained by selecting Area in Analyze Particles, and the diameter was calculated on the assumption that each pore was a circle. The surface pore diameter was obtained by averaging the pore diameters of 1,000 or more pores.

With respect to the cross-sectional pore diameter, a hollow fiber membrane, which was embedded using a commercially available embedding agent for frozen tissue section preparation (O.C. T. Compound, manufactured by Tissue-Tek Co., Ltd.), was sampled at −40° C. using a cryo ultramicrotome (FC7, manufactured by Leica) to obtain a section having a thickness of 100 nm with the porous membrane being oriented perpendicularly to the surface, and the section was dried under vacuum at room temperature overnight. The cross section of the hollow fiber membrane was observed with an SEM (S-5500, manufactured by Hitachi High-Technologies Corporation) or a TEM (JEM-1400 Plus, manufactured by JEOL Ltd.) to obtain an image, and the image was binarized using free software "ImageJ". In the binarization, a condition: Minimum was selected in Threshold (threshold for binarization). In the obtained binarized images, an area of each pore was obtained by selecting Area in Analyze Particles, and the diameter was calculated on the assumption that each pore was a circle. The cross-sectional pore diameter was obtained by averaging the pore diameters of 1,000 or more pores.

(Production of Hollow Fiber Membrane)

Reference Example 1

First, 39 wt % of vinylidene fluoride homopolymer having a weight average molecular weight of 417,000 (KF 1300 manufactured by Kureha Corporation, weight average molecular weight: 417,000, number average molecular weight: 221,000) and 61 wt % of γ-butyrolactone were dissolved at 150° C. to obtain a polymer solution as a raw material liquid.

For the pressure application and discharge of the obtained polymer solution, an apparatus including a double tube type spinneret, a tube connected to the spinneret, and two gear pumps disposed on the tube was used. In the tube between the gear pumps, the raw material liquid was retained at 100° C. to 103° C. for 15 seconds while being pressurized to 2.5 MPa. Thereafter, the raw material liquid was discharged from an outer tube of the double tube type spinneret while discharging an 85 wt % γ-butyrolactone aqueous solution from an inner tube. The raw material liquid was retained for 20 seconds in a cooling bath having a temperature of 5° C. and composed of 85 wt % γ-butyrolactone aqueous solution, and then solidified. Then, the hollow fiber membrane obtained above was stretched 1.5 times in water at 95° C. to obtain a support layer.

A functional layer was applied to the support layer obtained above to obtain a composite membrane. For the functional layer, 12 wt % of vinylidene fluoride homopolymer having a weight average molecular weight of 284,000, 7.2 wt % of cellulose acetate (CA435-75S, Eastman Chemical Company), and 80.8 wt % of N-methyl-2-pyrrolidone were mixed and dissolved at a temperature of 95° C. to prepare a high molecular solution.

The membrane producing raw liquid was uniformly applied to the surface of the hollow fiber membrane having a spherical structure, and immediately solidified in a coagulation bath composed of 100% water to prepare a hollow fiber membrane having a three-dimensional network structure layer formed on the spherical structure layer. The obtained hollow fiber membrane had an outer diameter of 1.30 mm, an inner diameter of 0.75 mm, pure water transmissivity of 0.4 m/hr, and strength of 1010 g/fiber. The pore diameter $\varphi_o$ of the outer surface was calculated as 0.006 μm from the binarized SEM image, and the pore diameter $\varphi_i$ of the inner surface was calculated as 0.6 μm from the cross-sectional pore diameter, and $\varphi_i/\varphi_o$ was 100.

The thickness Li of the spherical structure layer was 0.225 mm.

Reference Example 2

In Reference Example 1, the temperature of the coagulation bath for solidifying the membrane producing raw liquid of the functional layer was adjusted to produce a hollow fiber membrane having an outer surface with a pore diameter of 0.010 μm. In this case, the outer diameter was 1.30 mm, and the inner diameter was 0.75 mm, and the pure water transmission coefficient was 0.6 m/hr, and the strength was 1010 g/fiber, and $\varphi_i/\varphi_o$ was 60.

Reference Example 3

At a temperature of 95° C., 12 wt % of vinylidene fluoride homopolymer having a weight average molecular weight of 284,000, 7.2 wt % of cellulose acetate (CA435-75S, Eastman Chemical Company), and 80.8 wt % of N-methyl-2-pyrrolidone were mixed and dissolved to prepare a high molecular solution.

While discharging the adjusted high molecular solution from the outer tube of the double tube type spinneret and an injection liquid composed of 100% water from the inner tube of the double tube type spinneret, the high molecular solution was solidified in a coagulation bath composed of 100% water to produce a hollow fiber membrane constituted by a layer with a three-dimensional network structure. The obtained hollow fiber membrane had an outer diameter of 1.30 mm, an inner diameter of 0.75 mm, a pure water transmissivity of 0.5 m/hr, a strength of 230 g/fiber, a pore diameter $\varphi_o$ of the outer surface of 0.008 μm, and $\varphi_i/\varphi_o$ of 1.13.

(Production of Hollow Fiber Membrane Module)

The obtained hollow fiber membrane 5 was cut to a length of 1.2 m, immersed in a 30 mass % glycerin aqueous solution for 1 hour, and then air-dried. Thereafter, the filtrate outlet port side end of the hollow fiber membrane was sealed with a silicone adhesive (SH850A/B manufactured by Dow Toray Co., Ltd., a mixture of two agents at a mass ratio of 50:50).

Thereafter, as shown in FIG. 1, the container 1 (inner diameter: 97.6 mm, length: 1100 mm) was loaded with the above-described hollow fiber membrane 5 such that the sealed filtrate outlet port side end was positioned on the filtrate outlet port 3 side. The feed outlet port 4 is provided on a side surface on the filtrate outlet port 3 side of the container 1.

Subsequently, a first potting portion forming jig was attached to the feed inlet port 2 side of the container 1, and a second potting portion forming jig was attached to the filtrate outlet port 3 side. A pin having a diameter of 7 mm and a length of 100 mm was inserted into the first potting portion forming jig in the same direction as the axial direction of the hollow fiber membrane 5 in order to open a through hole for introducing the feed into the feed side space 6.

As a potting agent, a bisphenol F type epoxy resin (LST868-R14, manufactured by Huntsman Corporation) and an aliphatic amine-based curing agent (LST868-H14, manufactured by Huntsman Corporation) were mixed at a mass ratio of 100:30, and a total of 800 g of the mixture (400 g per end) was put into a potting agent injector.

Subsequently, a centrifugal molding machine was rotated, and the potting agent was injected into the first potting portion forming jig and the second potting portion forming jig at both ends to mold the first potting portion 8 and the second potting portion 9, and the potting agent was cured. The centrifugal molding machine had a temperature of 35° C., a rotational speed of 300 rpm, and a centrifugal time of 5 hours.

After curing, the first potting portion forming jig, the second potting portion forming jig, and the pin were removed, and after curing at room temperature for 24 hours, the end of the second potting portion 9 was cut with a tip saw type rotary blade to open an end surface of the hollow fiber membrane 5 on the filtrate outlet port side.

Subsequently, a lower cap including the feed inlet port 2 and an upper cap including the filtrate outlet port 3 were attached to the container 1 to obtain a hollow fiber membrane module. In this case, the hollow fiber membrane had a membrane length L of 1.0 m, a filling rate M of 40%, and a membrane area of 9.2 m².

(Filtration Test)

In a filtration test using the hollow fiber membrane module obtained above, the filtration unit shown in FIG. 2 was used. A volume of the feed tank 12 was 200 L, and the supply pump 14 was operated to introduce the feed into the hollow fiber membrane module, and a part of the feed was filtered and then a filtrate was sent to the filtrate tank 13. All the unfiltered feed was returned from the feed outlet port 4 to the feed tank 12. The filtrate sent to the filtrate tank 13 was returned to the feed tank 12 by a pump each time, and a water level in the feed tank was controlled so as not to decrease.

The filtration was performed at a constant flow amount, and the transmembrane pressure was increased as blockage of the membranes. Note that the transmembrane pressure here was calculated by subtracting the filtrate outlet pressure measured by a filtrate outlet pressure gauge 43 from an average value of a feed inlet pressure measured by a feed inlet pressure gauge 41 and a feed outlet pressure measured by a feed outlet pressure gauge 42. The operation was performed with the filtrate outlet pressure fixed to 20 kPa, and an increase speed (the unit is expressed as kPa/m hereinafter) in the transmembrane pressure was set to a value obtained by dividing the transmembrane pressure, which was increased until the filtration amount per membrane area (m³/m²) became 0.1 m³/m², by 0.1 m³/m².

Reference Example 4

It was verified how accurately the actual pressure distribution of the hollow fiber membrane module can be predicted by the simulation shown in the above Formulas (8) to (17).

Figure 5:
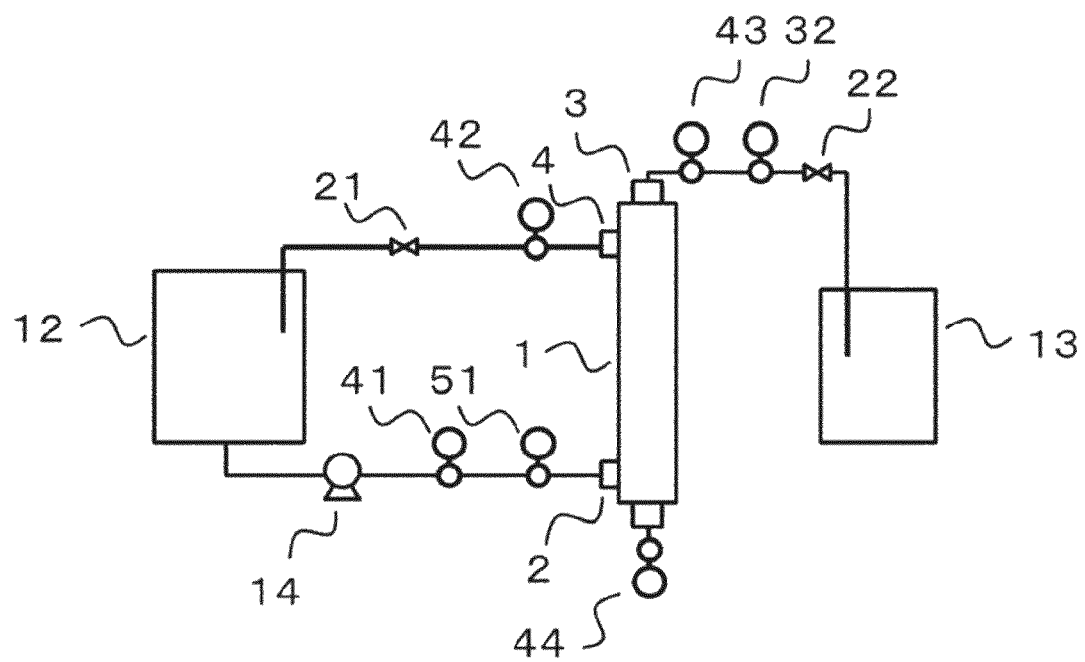
FIG. 5 is a schematic flow diagram showing an embodiment of a membrane filtration unit for verifying a simulation.

For the verification, another hollow fiber membrane module different from the above was prepared using the hollow fiber membrane obtained above. A fluorine tube having an inner diameter of 6 mm was used as the container 1, and fifteen hollow fiber membranes obtained above were potted in a state where both ends were opened such that the membrane length L became 1.0 m. The filling rate M in this case was 32%. As shown in FIG. 5, the feed inlet port 2 and the feed outlet port 4 are connected to a side surface of the tube, and the feed introduced from the feed inlet port 2 flows in the container 1 in a direction parallel to the axial direction of the hollow fiber membranes 5 and is discharged from the feed outlet port 4. In this case, the pressure measured by the feed inlet pressure gauge 41 was assumed as the feed inlet pressures $P_{o,0}$, and the pressure measured by the feed outlet pressure gauge 42 was assumed as the feed outlet pressures $P_{o,k}$.

On the other hand, a pressure gauge was connected to each of both open ends on the filtrate side, and the pressure measured by the filtrate outlet pressure gauge 43 provided in a tube connected to the filtrate tank 13 was assumed as the filtrate outlet pressures $P_{i,k}$, and the pressure measured by the filtrate inlet pressure gauge 44 on the other end side was assumed as the filtrate inlet pressures $P_{i,0}$.

In the hollow fiber membrane module 10 of the present application, as shown in FIG. 1, the filtrate outlet port side end of the hollow fiber membrane 5 is open, and the feed inlet port side end is sealed. Therefore, the filtrate inlet pressures $P_{i,0}$ at the position of n=0 among $P_{i,n}$ shown in Formula (16) cannot be actually measured. Therefore, a miniature module with both ends open was produced for verification of this simulation, and $P_{i,0}$ was measured. Note that since the space to which the filtrate inlet pressure gauge 44 for measuring $P_{i,0}$ is connected is sealed and the filtrate is not discharged to the filtrate inlet pressure gauge 44 side, the pressure distribution of the miniature module and the pressure distribution of the hollow fiber membrane module 10 show equivalent distributions.

A filtration test was performed using the miniature module. In the test, 0.3 wt % aqueous solution obtained by dissolving polyethylene glycol (molecular weight: 2,000,000, manufactured by FUJIFILM Wako Pure Chemical Corporation) in distilled water was used as a feed. The feed was dissolved by stirring with a stirrer overnight, and when a viscosity of the feed after dissolution was measured at 25° C., the viscosity was 5.0 mPa·s.

The feed was supplied to the miniature module by the supply pump 14, and cross-flow filtration was performed. Operation conditions in this case were as follows: the flow rate of the feed was 1.0 m/s, and the flow rate of the filtrate was 0.045 m/s (corresponding to a filtration flux of 0.4 m/d). The temperature of the feed was 25° C. Filtration was started under these operation conditions, and each pressure immediately after the start of filtration was measured to calculate $\Delta P_{m,0}$, and $\Delta P_{m,k}$. A viscosity of the filtrate collected during the test was also measured by the same method, and the measured viscosity was 1.0 mPa·s.

Furthermore, $\Delta P_{m,0}$ and $\Delta P_{m,k}$ were calculated also by simulation using Formulas (8) to (17). Various parameters of the hollow fiber membrane 5 used for producing the miniature module were input for the simulation. The filtrate outlet pressures $P_{o,k}$ was calculated using the measured values obtained from the test of the miniature module. Here, $\Delta l$ was set to 10 mm, and the shape correction coefficient τ of the feed side flow channel was set to 1.0.

As a result of comparing the measured values and the simulation values, as shown in Table 1, it was confirmed that $\Delta P_{m,0}$ and $\Delta P_{m,k}$ show equivalent values, and the present simulation can accurately predict the transmembrane pressure.

TABLE 1

| | Actual measurement | Calculation |
|---|---|---|
| $\Delta P_{m,0}$ [kPa] | 67 | 69 |
| $\Delta P_{m,k}$ [kPa] | 25 | 25 |
| $\Delta P_{m,0} - \Delta P_{m,k}$ [kPa] | 42 | 44 |

Example 1

Using the hollow fiber membrane module loaded with the hollow fiber membrane of Reference Example 1, filtration was performed using a polyethylene glycol aqueous solution. The polyethylene glycol aqueous solution was prepared by adjusting the amount of polyethylene glycol (molecular weight 2,000,000, manufactured by FUJIFILM Wako Pure Chemical Corporation) in distilled water to be 0.3 wt %, and was used as the feed. In this case, the feed had a temperature of 25° C. and a viscosity of 5.0 mPa·s.

Filtration was started after adjusting the flow rate $v_f$ of the feed to 1.0 m/s and the flow rate $v_p$ of the filtrate to 0.03 m/s (corresponding to 0.3 m/d in terms of filtration flux). As a result, as shown in Table 2, the increase speed of the transmembrane pressure was 230 kPa/m, and the operation could be performed while preventing the rise of the transmembrane pressure. The filtrate viscosity immediately after the start of filtration was 1.0 mPa·s.

TABLE 2

| | Parameter | Unit | Ex. 1 | Ex. 2 | Ex. 3 | Ex. 4 | Comp. Ex. 1 | Comp. Ex. 2 |
|---|---|---|---|---|---|---|---|---|
| Membrane structure | Outer diameter | mm | 1.30 | 1.30 | 1.30 | 1.30 | 1.30 | 1.30 |
| | Inner diameter | mm | 0.75 | 0.75 | 0.75 | 0.75 | 0.75 | 0.75 |
| | Pore diameter $\varphi_o$ of outer surface | μm | 0.006 | 0.006 | 0.006 | 0.006 | 0.006 | 0.006 |
| | Pore diameter $\varphi_i$ of inner surface | μm | 0.60 | 0.60 | 0.60 | 0.60 | 0.60 | 0.60 |
| | $\varphi_o/\varphi_i$ | — | 100 | 100 | 100 | 100 | 100 | 100 |
| | Thickness $L_o$ of three-dimensional network structure layer | mm | 0.050 | 0.050 | 0.050 | 0.050 | 0.050 | 0.050 |
| | Thickness $L_i$ of spherical structure layer | mm | 0.225 | 0.225 | 0.225 | 0.225 | 0.225 | 0.225 |

TABLE 2-continued

| | Parameter | Unit | Ex. 1 | Ex. 2 | Ex. 3 | Ex. 4 | Comp. Ex. 1 | Comp. Ex. 2 |
|---|---|---|---|---|---|---|---|---|
| | Cross-sectional pore diameter of three-dimensional network structure layer | µm | 0.025 | 0.025 | 0.025 | 0.025 | 0.025 | 0.025 |
| | Cross-sectional pore diameter of spherical structure layer | µm | 0.60 | 0.60 | 0.60 | 0.60 | 0.60 | 0.60 |
| | Porosity of three-dimensional network structure layer | — | 0.65 | 0.65 | 0.65 | 0.65 | 0.65 | 0.65 |
| | Porosity of spherical structure layer | — | 0.63 | 0.63 | 0.63 | 0.63 | 0.63 | 0.63 |
| | Transmission coefficient $Lp_o$ of three-dimensional network structure layer | µm/Pa/s | 0.045 | 0.045 | 0.045 | 0.045 | 0.045 | 0.045 |
| | Transmission coefficient $Lp_i$ of spherical structure layer | µm/Pa/s | 25 | 25 | 25 | 25 | 25 | 25 |
| Module structure | Inner diameter of container | mm | 97.6 | 97.6 | 97.6 | 97.6 | 97.6 | 97.6 |
| | Membrane length | m | 1.0 | 1.0 | 1.0 | 1.0 | 1.0 | 1.0 |
| | Filling rate | % | 40 | 40 | 40 | 40 | 40 | 40 |
| | Membrane area | m2 | 9.2 | 9.2 | 9.2 | 9.2 | 9.2 | 9.2 |
| Filtration test | Viscosity $\mu_f$ of feed | mPa·s | 5.0 | 5.0 | 5.0 | 10.0 | 5.0 | 5.0 |
| | Viscosity $\mu_p$ of filtrate | mPa·s | 1.0 | 1.0 | 1.0 | 1.4 | 1.0 | 1.0 |
| | $\mu_f/\mu_p$ | — | 5.0 | 5.0 | 5.0 | 7.1 | 5.0 | 5.0 |
| | Flow rate $V_f$ of feed | m/s | 1.0 | 1.0 | 1.0 | 0.5 | 0.5 | 2.0 |
| | Flow rate $V_p$ of filtrate | m/s | 0.03 | 0.05 | 0.11 | 0.05 | 0.16 | 0.01 |
| | Filtration flux | m/d | 0.3 | 0.5 | 1.0 | 0.5 | 1.5 | 0.1 |
| | $V_p/V_f$ | — | 0.03 | 0.05 | 0.11 | 0.11 | 0.32 | 0.01 |
| | Increase speed of transmembrane pressure | kPa/m | 230 | 250 | 265 | 260 | 420 | 370 |
| | $\Delta P_{m,0} - \Delta P_{m,k}$ | kPa | 43 | 43 | 41 | 42 | 10 | 87 |

In parallel with the actual filtration test, the calculation of the module internal pressure distribution by simulation was performed. The calculation method was the same as the method described in Reference Example 1. As a result, the transmembrane pressure difference $\Delta P_{m,0} - \Delta P_{m,k}$ in the axial direction of the hollow fiber membrane 5 was a low value of 43 kPa.

Example 2

A filtration test and a module internal pressure distribution simulation were performed in the same manner as in Example 1 except that the flow rate $v_p$ of the filtrate was adjusted to 0.05 m/s (corresponding to 0.5 m/d in terms of filtration flux).

As a result, as shown in Table 2, the increase speed of the transmembrane pressure became 250 kPa/m, and the operation could be performed while preventing the rise of the transmembrane pressure. The transmembrane pressure difference $\Delta P_{m,0} - \Delta P_{m,k}$ in this case was a low value of 43 kPa.

Example 3

A filtration test and a module internal pressure distribution simulation were performed in the same manner as in Example 1 except that the flow rate $v_p$ of the filtrate was adjusted to 0.11 m/s (corresponding to 1.0 m/d in terms of filtration flux).

As a result, as shown in Table 2, the increase speed of the transmembrane pressure became 265 kPa/m, and the operation could be performed while preventing the rise of the transmembrane pressure. The transmembrane pressure difference $\Delta P_{m,0} - \Delta P_{m,k}$ in this case was a low value of 41 kPa.

Example 4

Using the same hollow fiber membrane module as in Example 1, filtration was performed using a polyethylene glycol aqueous solution. The polyethylene glycol aqueous solution was prepared by adjusting the amount of polyethylene glycol (molecular weight 2,000,000, manufactured by FUJIFILM Wako Pure Chemical Corporation) in distilled water to be 0.45 wt %, and was used as the feed. In this case, the feed had a temperature of 25° C. and a viscosity of 10.0 mPa·s.

Filtration was started after adjusting the flow rate $v_f$ of the feed to 0.5 m/s and the flow rate $v_p$ of the filtrate to 0.05 m/s (corresponding to 0.5 m/d in terms of filtration flux). As a result, as shown in Table 2, the increase speed of the transmembrane pressure was 260 kPa/m, and the operation could be performed while preventing the rise of the transmembrane pressure. The filtrate viscosity immediately after the start of filtration was 1.4 mPa·s.

In parallel with the actual filtration test, the calculation of the module internal pressure distribution by simulation was performed. The calculation method was the same as the method described in Reference Example 1. As a result, the transmembrane pressure difference $\Delta P_{m,0} - \Delta P_{m,k}$ in the axial direction of the hollow fiber membrane 5 was a low value of 42 kPa.

Example 5

Using the same hollow fiber membrane module as in Example 1, filtration was performed using a gelatin aqueous solution. The gelatin aqueous solution was prepared by adjusting a concentration of gelatin in distilled water to 0.4 wt %, and was used as the feed. In this case, the feed had a temperature of 60° C. and a viscosity ($\mu_f$) of 3.5 mPa·s.

Filtration was started after adjusting the flow rate $v_f$ of the feed to 1.0 m/s and the flow rate $v_p$ of the filtrate to 0.03 m/s (corresponding to 0.3 m/d in terms of filtration flux). As a result, as shown in Table 3, the increase speed of the transmembrane pressure was 260 kPa/m, and the operation could be performed while preventing the rise of the transmembrane pressure. The filtrate viscosity immediately after the start of filtration was 1.1 mPa·s, and $\mu_f/\mu_p$ was 3.2.

When the transmembrane pressure reached 1.5 times the initial ratio, the filtration was terminated, and pure water was pressurized at 200 kPa to flow from the filtrate side to perform backwashing for 15 seconds. After the backwashing, the gelatin aqueous solution was filtered at a flow rate $v_f$ of the feed of 1.0 m/s and a flow rate $v_p$ of the filtrate of 0.03 m/s (corresponding to 0.3 m/d in terms of filtration flux), and the transmembrane pressure was recovered to 1.1 times the initial ratio, and the effect of the backwashing was confirmed.

Example 7

A hollow fiber membrane module loaded with the hollow fiber membrane of Reference Example 3 was produced and filtration was performed using a gelatin aqueous solution. The gelatin aqueous solution used was the same as in Example 5.

TABLE 3

| | Parameter | Unit | Ex. 5 | Ex. 6 | Ex. 7 |
|---|---|---|---|---|---|
| Membrane structure | Outer diameter | mm | 1.3 | 1.3 | 1.3 |
| | Inner diameter | mm | 0.75 | 0.75 | 0.75 |
| | Pore diameter $\varphi_o$ of outer surface | μm | 0.006 | 0.01 | 0.008 |
| | Pore diameter $\varphi_i$ of inner surface | μm | 0.60 | 0.60 | 0.009 |
| | $\varphi_o/\varphi_i$ | — | 100 | 60 | 1.13 |
| | Thickness $L_o$ of three-dimensional network structure layer | mm | 0.050 | 0.050 | 0.275 |
| | Thickness $L_i$ of spherical structure layer | mm | 0.225 | 0.225 | — |
| | Cross-sectional pore diameter of three-dimensional network structure layer | μm | 0.025 | 0.035 | 0.030 |
| | Cross-sectional pore diameter of spherical structure layer | μm | 0.60 | 0.60 | — |
| | Porosity of three-dimensional network structure layer | — | 0.65 | 0.66 | 0.64 |
| | Porosity of spherical structure layer | — | 0.63 | 0.63 | — |
| | Transmission coefficient $Lp_o$ of three-dimensional network structure layer | μm/Pa/s | 0.045 | 0.091 | 0.065 |
| | Transmission coefficient $Lp_i$ of spherical structure layer | μm/Pa/s | 25 | 25 | — |
| Module structure | Inner diameter of container | mm | 97.6 | 97.6 | 97.6 |
| | Membrane length | m | 1.0 | 1.0 | 1.0 |
| | Filling rate | % | 40 | 40 | 40 |
| | Membrane area | m$^2$ | 9.2 | 9.2 | 9.2 |
| Filtration test | Viscosity $\mu_f$ of feed | mPa·s | 3.5 | 3.5 | 3.5 |
| | Viscosity $\mu_p$ of filtrate | mPa·s | 1.1 | 1.2 | 1.1 |
| | $\mu_f/\mu_p$ | — | 3.2 | 2.9 | 3.2 |
| | Flow rate $V_f$ of feed | m/s | 1.0 | 1.0 | 1.0 |
| | Flow rate $V_p$ of filtrate | m/s | 0.03 | 0.03 | 0.03 |
| | Filtration flux | m/d | 0.3 | 0.3 | 0.3 |
| | $V_p/V_f$ | — | 0.03 | 0.03 | 0.03 |
| | Increase speed of transmembrane pressure | kPa/m | 260 | 280 | 290 |
| | $\Delta P_{m,0} - \Delta P_{m,k}$ | kPa | 30 | 30 | 30 |

Example 6

A hollow fiber membrane module loaded with the hollow fiber membrane of Reference Example 2 was produced and filtration was performed using a gelatin aqueous solution. The gelatin aqueous solution used was the same as in Example 5.

Filtration was started after adjusting the flow rate $v_f$ of the feed to 1.0 m/s and the flow rate $v_p$ of the filtrate to 0.03 m/s (corresponding to 0.3 m/d in terms of filtration flux). As a result, as shown in Table 3, the increase speed of the transmembrane pressure was 280 kPa/m, and the operation could be performed while preventing the rise of the transmembrane pressure. The filtrate viscosity immediately after the start of filtration was 1.2 mPa·s, and $\mu_f/\mu_p$ was 2.9.

When the transmembrane pressure reached 1.5 times the initial ratio, the filtration was terminated, and pure water was pressurized at 200 kPa to flow from the filtrate side to perform backwashing for 15 seconds. After the backwashing, the gelatin aqueous solution was filtered at a flow rate $v_f$ of the feed of 1.0 m/s and a flow rate $v_p$ of the filtrate of 0.03 m/s (corresponding to 0.3 m/d in terms of filtration flux), and the transmembrane pressure was recovered to 1.1 times the initial ratio, and the effect of the backwashing was confirmed.

Filtration was started after adjusting the flow rate $v_f$ of the feed to 1.0 m/s and the flow rate $v_p$ of the filtrate to 0.03 m/s (corresponding to 0.3 m/d in terms of filtration flux). As a result, as shown in Table 3, the increase speed of the transmembrane pressure was 290 kPa/m, and the operation could be performed while preventing the rise of the transmembrane pressure. The filtrate viscosity immediately after the start of filtration was 1.1 mPa·s, and $\mu_f/\mu_p$ was 3.2.

When the transmembrane pressure reached 1.5 times the initial ratio, the filtration was terminated, and pure water was pressurized at 200 kPa to flow from the filtrate side to perform backwashing for 15 seconds. After the backwashing, the gelatin aqueous solution was filtered at a flow rate $v_f$ of the feed of 1.0 m/s and a flow rate $v_p$ of the filtrate of 0.03 m/s (corresponding to 0.3 m/d in terms of filtration flux), the transmembrane pressure was increased to 1.4 times the initial ratio, and the effect of the backwashing could not be confirmed. It was considered that the effect of the backwashing was reduced because $\varphi_i/\varphi_o$, which is the ratio of the pore diameters was small.

Comparative Example 1

A filtration test and a module internal pressure distribution simulation were performed in the same manner as in Example 1 except that the flow rate $v_f$ of the feed was adjusted to 0.5 m/s, and the flow rate $v_p$ of the filtrate was adjusted to 0.16 m/s (corresponding to 1.5 m/d in terms of filtration flux).

As a result, as shown in Table 2, the increase speed of the transmembrane pressure was 420 kPa/m, and the increase speed of the transmembrane pressure was high. The transmembrane pressure difference $\Delta P_{m,0} - \Delta P_{m,k}$ in this case was a low value of 10 kPa, but it was considered that the flow rate of the feed was slower than the flow rate of the filtrate, and the accumulation of the foulant on the membrane surface progressed, and the increase in the transmembrane pressure became fast.

Comparative Example 2

A filtration test and a module internal pressure distribution simulation were performed in the same manner as in Example 1 except that the flow rate $v_f$ of the feed was adjusted to 2.0 m/s, and the flow rate $v_p$ of the filtrate was adjusted to 0.10 m/s (corresponding to 0.1 m/d in terms of filtration flux).

As a result, as shown in Table 2, the increase speed of the transmembrane pressure was 370 kPa/m, and the increase speed of the transmembrane pressure was high. The transmembrane pressure difference $\Delta P_{m,0} - \Delta P_{m,k}$ in this case was a high value of 87 kPa, and furthermore, it was presumed that reverse filtration in which a part of the filtrate flows back to the feed side occurred, and the filtration was inefficient. Since the filtration flux was small and it was calculated that three times as many hollow fiber membrane modules as in Example 1 were required, the filtration cost was high.

Although the present invention has been described in detail with reference to specific embodiments, it is apparent to those skilled in the art that various changes and modifications can be made without departing from the spirit and scope of the present invention.

The present application is based on the Japanese patent application filed on Sep. 30, 2021 (Japanese Patent Application No. 2021-160479), an entire content of which is incorporated herein by reference.

INDUSTRIAL APPLICABILITY

The operation method of a hollow fiber membrane module of the present invention is preferably applied to membrane filtration of a feed in a fermentation field involving culture of microorganisms and cultured cells, a pharmaceutical field, a food and drink field, or the like in recent years, in addition to a water treatment field such as drinking water production, water purification treatment, and wastewater treatment.

REFERENCE SIGNS LIST

1 container
2 feed inlet port
3 filtrate outlet port
4 feed outlet port
5 hollow fiber membrane
6 feed side space
7 filtrate side space
8 first potting portion
9 second potting portion
10 hollow fiber membrane module
12 feed tank
13 filtrate tank
14 supply pump
15 constant-temperature-water bath
16 fine tube
21 concentrate valve
22 filtrate valve
31 concentrate flowmeter
32 filtrate flowmeter
41 feed inlet pressure gauge
42 feed outlet pressure gauge
43 filtrate outlet pressure gauge
44 filtrate inlet pressure gauge
45 tube inlet pressure gauge
46 tube outlet pressure gauge
51 feed thermometer

The invention claimed is:

1. An operation method of a hollow fiber membrane module, the operation method comprising:
    a filtration step of performing cross-flow filtration by supplying a feed to an outer surface side of a hollow fiber membrane,
    wherein:
    in the filtration step, a ratio of a viscosity $\mu_f$ of the feed to a viscosity $\mu_p$ of a filtrate satisfies a relation of $\mu_f/\mu_p \geq 1.5$, and a flow rate ratio of a flow rate $v_p$ of the filtrate to a flow rate $v_f$ of the feed satisfies a relation of $0.02 \leq v_p/v_f \leq 0.3$, and
    the flow rate vf of the feed is calculated by dividing a concentrate flow amount $Q_c$ by a flow channel area $S_f$ of a feed side space of the hollow fiber membrane module in accordance with the following Formula 1

$$v_f = \frac{Q_c}{S_f} = \frac{Q_c}{\pi(D_c/2)^2 - \pi(D_o/2)^2 N}, \quad (1)$$

where $D_c$ is an inner diameter of a container, $D_o$ is an outer diameter of the hollow fiber membrane and N is the number of hollow fiber membranes,
the flow rate $v_p$ of the filtrate is calculated by dividing a filtrate flow amount $Q_p$ by a flow channel area $S_p$ of a filtrate side space in accordance with the following Formula 2

$$v_p = \frac{Q_p}{S_p} = \frac{Q_p}{\pi(D_i/2)^2 N}, \quad (2)$$

where $D_i$ is an inner diameter of the hollow fiber membrane, a viscosity is measured at the same temperature and shear speed as in actual operation using a capillary viscometer in accordance with the following Formula 5

$$\gamma = \frac{4v}{D_e} \quad (3)$$

$$D_e = \frac{4S_f}{\pi D_0 N + \pi D_C} \quad (4)$$

$$\mu = \frac{D_v^2(P_1 - P_2)}{32 v_v L_v} \quad (5)$$

where $P_1$ is a tube inlet pressure and $P_2$ is a tube outlet pressure when a fluid is passed through a fine tube having a tube inner diameter $D_v$ and a tube length $L_v$ at a flow rate $v_v$, and the flow rate $v_v$ in the fine tube is set so that a shear speed during the actual operation and a shear speed in the capillary viscometer are the same using the above Formula 3; and a shear speed y is calculated from a flow rate v and a flow channel diameter $D_e$ by the above Formula 3, a flow channel diameter $D_e$ of the filtrate side space is the inner diameter $D_i$ of the hollow fiber membrane, and a flow channel diameter $D_e$ of the feed side space is calculated by the above Formula 4.

2. The operation method of a hollow fiber membrane module according to claim 1, wherein in the filtration step, the viscosity $\mu_f$ of the feed is 3.0 mPa·s or more.

3. The operation method of a hollow fiber membrane module according to claim 1, wherein in the filtration step, a concentration of dissolved organic carbon in the feed is 1,000 mg/L or more and 100,000 mg/L or less.

4. The operation method of a hollow fiber membrane module according to claim 1, wherein the hollow fiber membrane is an ultrafiltration membrane.

5. The operation method of a hollow fiber membrane module according to claim 1, wherein a breaking tenacity of the hollow fiber membrane is 500 gf/fiber or more.

6. The operation method of a hollow fiber membrane module according to claim 1, wherein in the filtration step, the viscosity $\mu_f$ of the feed and the flow rate $v_f$ of the feed satisfy a relation of $v_f \leq -0.135\mu_f + 3.0$.

7. The operation method of a hollow fiber membrane module according to claim 1, wherein an inner diameter $D_i$ of the hollow fiber membrane satisfies a relation of 300 µm≤$D_i$≤1000 µm.

8. The operation method of a hollow fiber membrane module according to claim 1, wherein a filling ratio of the hollow fiber membrane module is 25% or more and 45% or less.

9. The operation method of a hollow fiber membrane module according to claim 1, wherein a membrane length of the hollow fiber membrane is 0.50 m or more and 2.00 m or less.

10. The operation method of a hollow fiber membrane module according to claim 1, the operation method further comprising:

a backwashing step of flowing a cleaning liquid from an inner surface to an outer surface of the hollow fiber membrane, wherein a pore diameter $\varphi_o$ of the outer surface of the hollow fiber membrane satisfies a relation of 0.005 µm≤$\Phi_o$≤0.02 µm, and a ratio of a pore diameter $\varphi_i$ of the inner surface of the hollow fiber membrane to the pore diameter $\varphi_o$ of the outer surface satisfies a relation of $\varphi_i/\varphi_o$>50.

* * * * *